United States Patent
Kang et al.

(10) Patent No.: US 9,246,200 B2
(45) Date of Patent: Jan. 26, 2016

(54) BATTERY MODULE RECEIVING APPARATUS, BATTERY MODULE THERMOSTAT, AND POWER STORAGE SYSTEM COMPRISING THE SAME

(71) Applicant: LG CHEM, LTD., Seoul (KR)

(72) Inventors: Jung-Soo Kang, Daejeon (KR); Young-Bo Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 13/895,549

(22) Filed: May 16, 2013

(65) Prior Publication Data

US 2013/0244066 A1 Sep. 19, 2013

Related U.S. Application Data

(63) Continuation of application No. PCT/KR2011/010248, filed on Dec. 28, 2011.

(30) Foreign Application Priority Data

Dec. 28, 2010 (KR) .................. 10-2010-0136797
Dec. 28, 2011 (KR) .................. 10-2011-0144325

(51) Int. Cl.
*H01M 10/50* (2006.01)
*H01M 10/617* (2014.01)
*H01M 2/10* (2006.01)
(Continued)

(52) U.S. Cl.
CPC ........ *H01M 10/5008* (2013.01); *H01M 2/1077* (2013.01); *H01M 10/6552* (2015.04); *H01M 10/6554* (2015.04)

(58) Field of Classification Search
None
See application file for complete search history.

(56) References Cited

U.S. PATENT DOCUMENTS

| 6,106,972 A | 8/2000 | Kokubo et al. |
| 2001/0031392 A1* | 10/2001 | Ogata et al. ............ 429/99 |

(Continued)

FOREIGN PATENT DOCUMENTS

| JP | 7-14616 A | 1/1995 |
| JP | 9-326264 A | 12/1997 |
| JP | 11-26031 A | 1/1999 |

(Continued)

OTHER PUBLICATIONS

International Search Report issued in PCT/KR2011/010248, mailed on Jul. 9, 2012.

(Continued)

*Primary Examiner* — Patrick Ryan
*Assistant Examiner* — Christopher Domone
(74) *Attorney, Agent, or Firm* — Birch, Stewart, Kolasch & Birch, LLP

(57) ABSTRACT

Disclosed is a battery module receiving apparatus of a rectangular parallelepiped shape having an inner space with the open front and rear, in which a plurality of battery cell insertion slots are formed at corresponding locations on the upper plate and the lower plate constituting the inner space to erectly insert a plurality of battery cells, and a plurality of heat transfer plate insertion slots are formed adjacent to a plurality of the battery cell insertion slots to erectly insert a plurality of heat transfer plates. A battery pack and a stack-type power storage system may be implemented by inserting a battery module through the front of the battery module receiving apparatus and a battery module thermostat through the rear of the battery module receiving apparatus.

13 Claims, 19 Drawing Sheets

(51) Int. Cl.
*H01M 10/6552* (2014.01)
*H01M 10/6554* (2014.01)

(56) References Cited

U.S. PATENT DOCUMENTS

2005/0214636 A1* 9/2005 Li .................................. 429/120
2012/0009457 A1* 1/2012 Lee et al. ....................... 429/120

FOREIGN PATENT DOCUMENTS

| | | | |
|---|---|---|---|
| JP | 2006-244755 A | | 9/2006 |
| JP | 2006-338934 A | | 12/2006 |
| JP | 2009-9889 A | | 1/2009 |
| JP | 2009-252646 A | | 10/2009 |
| JP | 2009252646 | * | 10/2009 |
| JP | 2010-192207 A | | 9/2010 |
| JP | 2010-282767 A | | 12/2010 |
| JP | 2010-287550 A | | 12/2010 |
| KR | 10-2004-0082437 A | | 9/2004 |
| KR | 10-2008-0042965 A | | 5/2008 |
| KR | 10-2010-0041452 A | | 4/2010 |
| KR | 10-2010-0095457 A | | 8/2010 |
| WO | WO 03/071616 A2 | | 8/2003 |
| WO | WO 2009/066881 A1 | | 5/2009 |

OTHER PUBLICATIONS

Written Opinion of the International Searching Authority issued in PCT/KR2011/010248, mailed on Jul. 9, 2012.

* cited by examiner (a)

(b)

(c)

(a)            (b)

(a) (b)

(a)                  (b)

(a)  (b)

BATTERY MODULE RECEIVING APPARATUS, BATTERY MODULE THERMOSTAT, AND POWER STORAGE SYSTEM COMPRISING THE SAME

CROSS-REFERENCE TO RELATED APPLICATION

This application is a continuation of International Application PCT/KR2011/010248 filed on Dec. 28, 2011, which claims priorities from Korean Patent Application No. 10-2010-0136797 filed on Dec. 28, 2010, and Korean Patent Application No. 10-2011-0144325 filed on Dec. 28, 2011, the entire disclosure of which is incorporated herein by reference for all purposes.

BACKGROUND

1. Field

The present invention relates to a battery module receiving apparatus and a power storage system comprising the same, and more particularly, to a battery module receiving apparatus for easily receiving and replacing battery cells or modules and a battery module thermostat and for uniformly controlling the temperature between the battery cells, a battery module thermostat, and a power storage system comprising the same.

2. Description of Related Art

A secondary battery has high applicability depending on the product group and excellent electrical characteristics such as high energy density, and thus is commonly used as an electric power source of electric vehicles (EVs) or hybrid vehicles (HVs) as well as mobile devices.

This secondary battery is repeatedly charged and discharged by electrochemical reactions between the components or elements including an electrode current collector, a separator, an active material, an electrolyte, and an aluminum thin-film layer, and thus has a primary advantage of greatly reducing the use of fossil fuels. Also, since a secondary battery does not generate by-products that come with energy consumption, it can improve energy efficiency and is considered environmentally friendly. For these reasons, a secondary battery is gaining attention as an alternative energy source.

A secondary battery as an elementary unit is a battery cell, a plurality of secondary batteries are an assembly or a battery module, and a plurality of assemblies are a battery pack. However, the present invention is not limited in this regard. Unless otherwise stated, a secondary battery stated herein is used to commonly indicate a battery cell, a battery module, and a battery pack.

Recently, with the increasing significance of global issues relating to the exhaustion of energy resources such as fossil fuels, environmental pollution, economically efficient energy use, and the like, a smart grid system has been actively studied to effectively overcome the inequality in power consumption and power production and solve the problems caused thereby, such as, for example, the waste of power when power is oversupplied and power overload when power supply is in shortage. The smart grid system flexibly controls the power supply using a variety of information and communication infrastructures.

In other words, the infrastructure of a smart grid system is configured to store surplus power when power consumption is low and supply the stored power with supply power to consumers when power consumption is high.

In this instance, the smart grid system needs a medium for storing power. As such a medium, a secondary battery or a battery pack is dominantly used.

A power storage system may be used in various fields as well as smart grid systems. For example, a power storage system may be used in EV charging stations that store a great amount of power needed to supply to EVs.

To implement a high capacity power storage system, a battery pack constituting the system includes a considerable number of secondary batteries assembled in various configurations, for example, a tower-type stack battery pack in which battery packs are vertically stacked. However, since a secondary battery is repeatedly charged and discharged by electrochemical reactions inside the battery, the secondary battery cannot avoid the heat generated during charging and discharging. The heat generation dramatically increases during charging and discharging as the capacity is higher.

Heat may cause potential injury or damage to a secondary battery allowing electrochemical reactions, resulting in deterioration in the performance of the battery, which may not guarantee the life of the battery. Furthermore, heat is also known as a fatal factor exerting a bad influence on the safety of the battery, which may cause explosion and the like.

Accordingly, a secondary battery needs cooling during operation. Particularly, in the case of a high-capacity high-integration power storage system, a cooling system is even more necessary to solve the heat generation problem.

However, a conventional cooling system only focuses on cooling an individual battery cell or module rather than the entire power storage system.

Since the conventional cooling system employs an independent operation to individually cool battery cells or modules constituting a tower-type stack battery pack, there is variation in the cooling performance, which makes it difficult to uniformly cool the battery cells or modules. Also, excessive cooling may occur due to overlapping in cooling. To enable individual control, a battery management system (BMS) suitable for individual control and logic for operating such a BMS should be provided, and as a result, a complex air conditioning system along with very low efficiency in the maintenance and repair of the system are posed.

On the other hand, when the temperature of a secondary battery becomes too low at cold start, the performance of a power storage system may reduce. In this case, suitable heating is required. Accordingly, there is a need for a mechanism for properly maintaining the temperature of a secondary battery through suitable cooling and heating and for easily and uniformly controlling the temperature between battery cells, between battery modules, or further between battery packs.

DISCLOSURE

The present invention is designed to solve the conventional problems or meet the needs above, and therefore it is an object of the present invention to provide a battery module receiving apparatus for easily receiving and replacing battery cells or modules together with a thermostat.

It is another object of the present invention to provide a battery module thermostat for easily and uniformly controlling the temperature between battery cells or modules and that is easy and simple to maintain and repair.

It is another object of the present invention to provide a power storage system in which a plurality of battery module receiving apparatuses for receiving battery modules and a thermostat are included to efficiently and uniformly control the temperature over the system and that is easy and simple to maintain and repair.

Additional features of the invention will be set forth in the description which follows, and in part will be apparent from the description, or may be learned by practice of the invention.

In an aspect of the present invention, provided is a battery module receiving apparatus having an inner space for receiving a plurality of plate-like battery cells and a plurality of heat transfer plates of a thermostat, the battery module receiving apparatus including first and second side plates provided opposite to each other to form the opposite side surfaces of the inner space, an upper plate connecting the upper edges of the first and second side plates to form an upper surface of the inner space, and a lower plate, opposite to the upper plate, connecting the lower edges of the first and second side plates to form a lower surface of the inner space, wherein a plurality of battery cell insertion slots are formed on the lower surface of the upper plate and the upper surface of the lower plate at corresponding locations parallel to the first and second side plates to erectly insert a plurality of the battery cells, and a plurality of heat transfer plate insertion slots are formed adjacent to a plurality of the battery cell insertion slots on the lower surface of the upper plate and the upper surface of the lower plate at corresponding locations parallel to the first and second side plates to erectly insert the heat transfer plates.

According to a preferred embodiment, a plurality of the battery cell insertion slots are formed starting from the front end of the upper plate and the lower plate and ending with a location spaced away from the rear end at a predetermined distance so that a plurality of the battery cells can only be inserted through the front of the battery module receiving apparatus.

According to a preferred embodiment, a plurality of the heat transfer plate insertion slots are formed starting from the rear end of the upper plate and the lower plate and ending with a location spaced away from the front end at a predetermined distance so that the heat transfer plates can only be inserted through the rear of the battery module receiving apparatus.

In another aspect of the present invention, provided is a thermostat used for cooling or heating a plurality of plate-like battery cells received parallel to each other in a battery module receiving apparatus, the thermostat including a first heat transfer plate inserted between a plurality of the battery cells in contact with the surfaces of the battery cells to exchange heat with the battery cells, a heat pipe installed to the first heat transfer plate and extending to the outside of the battery module receiving apparatus, and a second heat transfer plate connected to an end of the heat pipe extending to the outside of the battery module receiving apparatus at the outside of the battery module receiving apparatus to exchange heat with the air.

According to a preferred embodiment, two of the first heat transfer plates are inserted between a pair of adjacent battery cells in contact with the surfaces of the battery cells, and the heat pipe is inserted between two of the first heat transfer plates to connect to the first heat transfer plates.

According to another embodiment, the heat pipe is connected to one side of the first heat transfer plate.

The thermostat may further include a fan to forcedly supply air to the second heat transfer plate.

In still another aspect of the present invention, provided is a power storage system including a plurality of battery packs and a thermostat to cool or heat a plurality of battery cells received in an inner space of each of the battery packs, wherein each of a plurality of the battery cells has a rectangular plate shape, each of a plurality of the battery packs erectly receives a plurality of the battery cells in the inner space thereof parallel to each other, and the thermostat includes a plurality of first heat transfer plates, a plurality of heat pipes and a second heat transfer plate, the first heat transfer plates being inserted between a plurality of the battery cells of each of the battery packs in contact with the surfaces of the battery cells, the heat pipes being installed to a plurality of the first heat transfer plates and extending to the outside of the battery packs, and the second heat transfer plate being commonly connected to ends of a plurality of the heat pipes extending to the outside of the battery packs at the outside of the battery packs.

Effect of the Invention

According to the present invention, the battery pack and the stack-type power storage system can be implemented by pushing the battery module from the front to the rear of the battery module receiving apparatus and pushing the thermostat from the rear to the front of the battery module receiving apparatus. Accordingly, the battery pack and the power storage system can be implemented by a simple operation, and maintenance and repair can also be easily conducted by replacing a specific battery cell or thermostat component.

Also, by using the heat transfer plate and the heat pipe contacting the air, the battery cells contacting the heat transfer plate can be cooled and heated without the supply of separate power or energy and the temperature of the battery cells can be constantly maintained at a uniform level. Also, by entirely covering the power storage system with the heat transfer plate contacting the air, the temperature between the battery cells or between the battery packs can be uniformly maintained. As a result, the life of the battery cells can be prolonged and the performance of the system can be maximized.

Furthermore, the structure for controlling the temperature of the battery cells is very simple and compact, thereby achieving the minimization of the power storage system.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The present invention will now be described in detail with reference to the accompanying drawings. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

Figure 1:
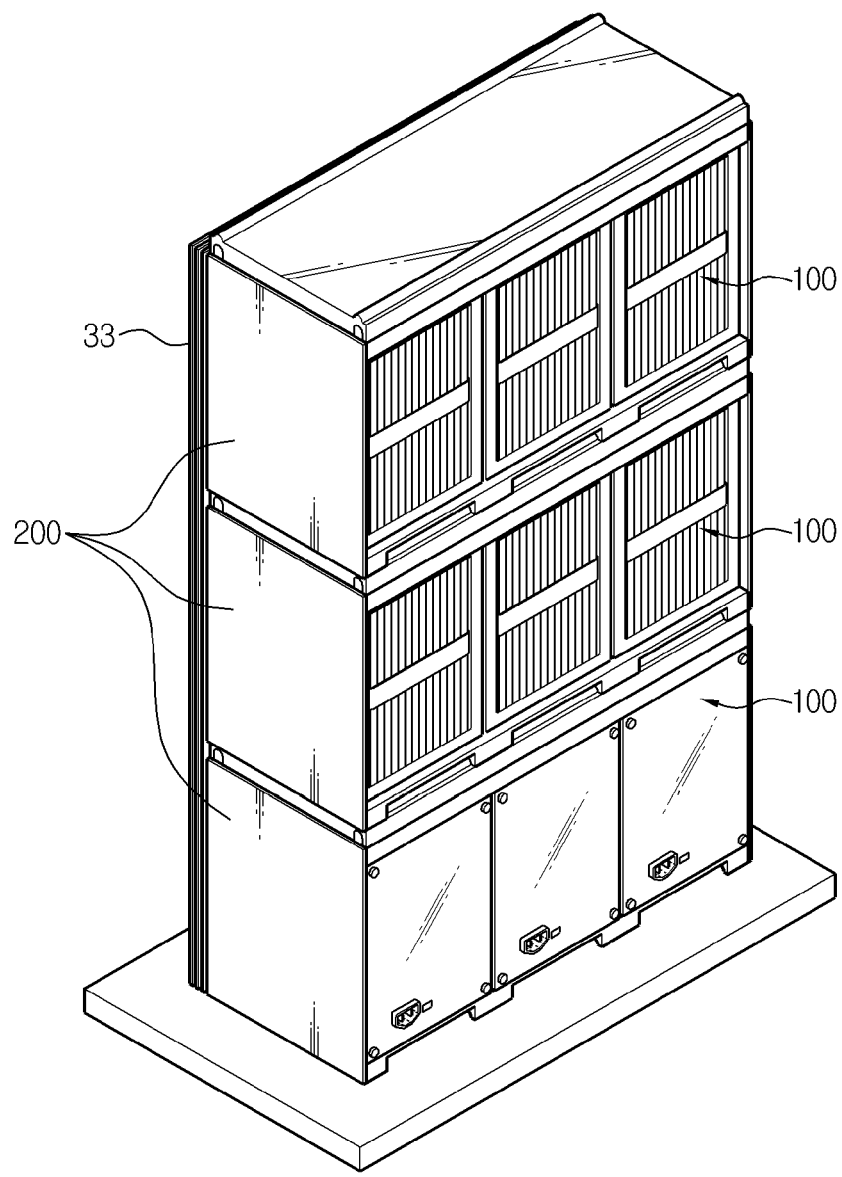
FIG. 1 is a perspective view illustrating an entire structure of a power storage system according to the present invention.

FIG. 1 is a perspective view illustrating an entire structure of a power storage system according to the present invention. The power storage system according to the present invention is generally and comprehensively described with reference to FIG. 1, and the components and elements of the power storage system will be described in more detail later.

It should be understood that the terms used to indicate the direction in the description and claims which follow, such as 'upper', 'lower', 'right', 'left', 'front', and 'rear' are relative terms for depicting the direction viewed on the drawings, and that elements shown in the drawings are exaggerated or reduced in dimension for the convenience of understanding.

As shown in FIG. 1, the power storage system of the present invention has a stack of at least one stair of battery pack case 200. At least one battery pack 100 is received in each stair of the battery pack case 200. In FIG. 1, the power storage system has a stack of three stairs of battery pack cases 200 and three battery packs 100 are received in each stair of the battery pack case 200. However, this is just an example for the purpose of illustrations only, and various modifications and variation can be made on the number of the battery packs and the number of stairs of the battery pack cases. Although FIG. 1 shows a front plate (27 of FIG. 4) is attached to the battery packs at the lowest stair and not attached to the remaining stairs, the front plate may or may not attach to all or part of the battery packs when needed.

The battery pack 100 described herein includes a battery module containing a plurality of battery cells or assembles according to embodiments that is received in a battery module receiving apparatus of the present invention to be described below in more detail. As described below, the battery module receiving apparatus receives a thermostat, in particular, a first heat transfer plate (and a heat pipe according to embodiments) as well as the battery module. That is, the battery module receiving apparatus may receive the battery module, and the first heat transfer plate or the first heat transfer plate and the heat pipe. Accordingly, the battery pack 100 may include the battery module, the components of the thermostat and the battery module receiving apparatus, however hereinafter the battery pack 100 will be conceptually described as having the battery module and the battery module receiving apparatus for the purpose of convenience and easy understanding.

In the power storage system of the present invention, at least one battery pack 100 may be electrically connected in series or in parallel in various configurations according to embodiments, and may function as an independent power source.

In FIG. 1, the reference numeral 33 is a second heat transfer plate of the thermostat. The second heat transfer plate 33 preferably covers the entire rear of the power storage system. However, the second heat transfer plate 33 may be plural, each having a size sufficient to cover the battery pack 100 or the battery pack case 200.

Although not shown in FIG. 1, a housing may be provided to surround the entire power storage system. The housing may accommodate a fan (34 of FIG. 6) or a control system not described in the detailed description.

Hereinafter, the battery module receiving apparatus constituting the power storage system according to the present invention is described in more detail with reference to FIGS. 2 to 4.

Figure 2:
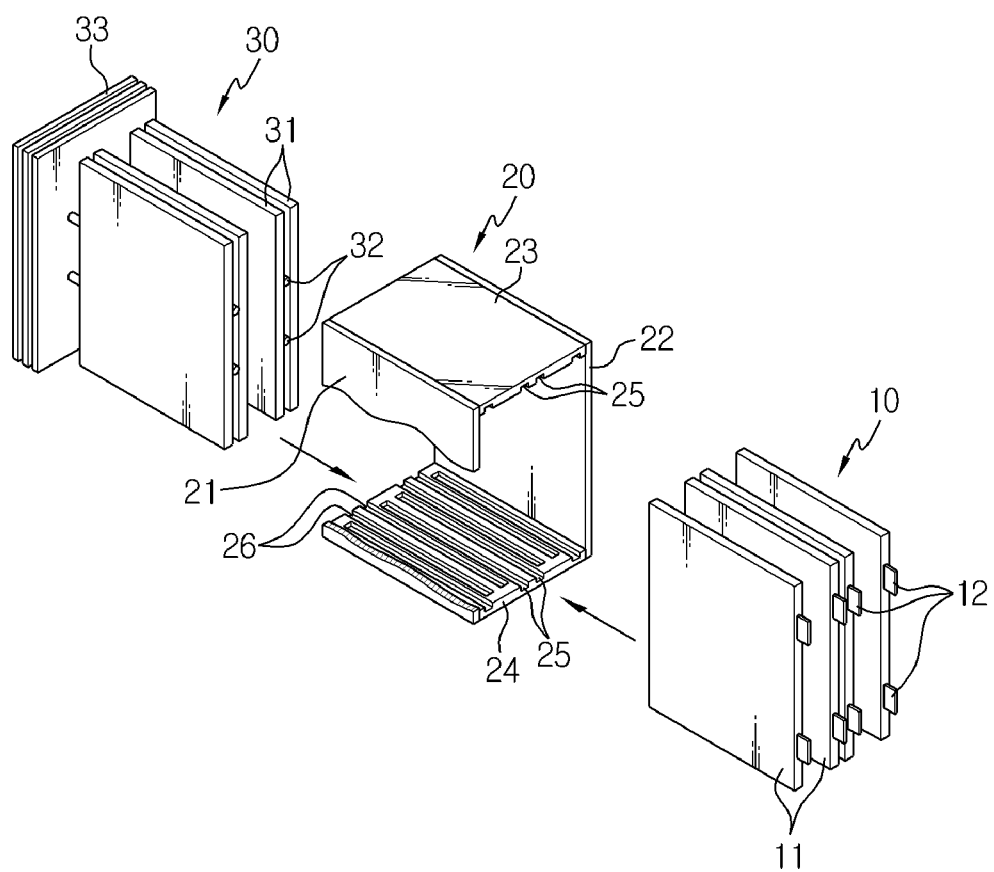
FIG. 2 is a partial cut-away exploded perspective view illustrating a battery module receiving apparatus for receiving a battery module and a thermostat according to an embodiment of the present invention.

FIG. 2 is a partial cut-away exploded perspective view illustrating a battery module receiving apparatus for receiving a battery module and a thermostat according to an embodiment of the present invention. FIG. 3 is a plane view of FIG. 2 exclusive of an upper plate for the purpose of convenience and easy understanding. FIG. 4 is an exploded perspective view illustrating a battery pack including the battery module receiving apparatus of FIGS. 2 and 3.

Figure 3:
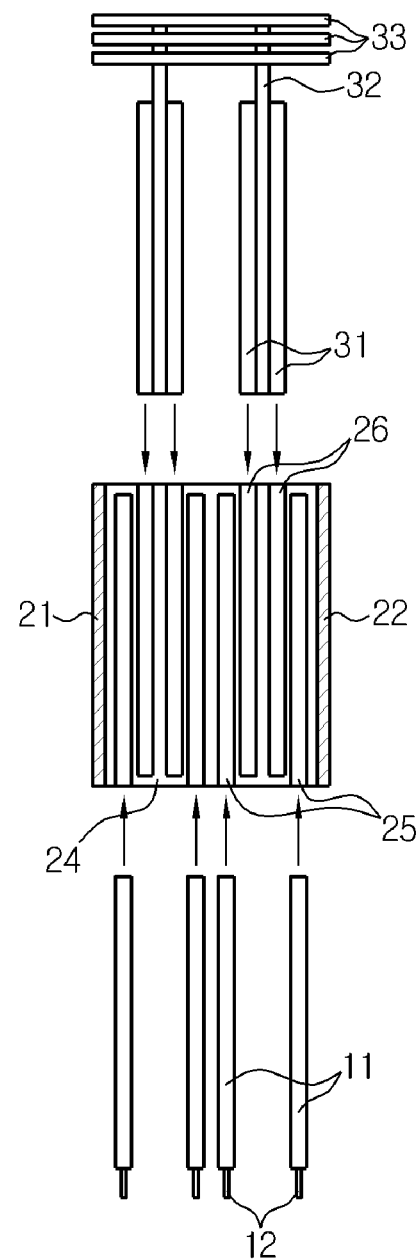
FIG. 3 is a plane view of FIG. 2.
Figure 4:
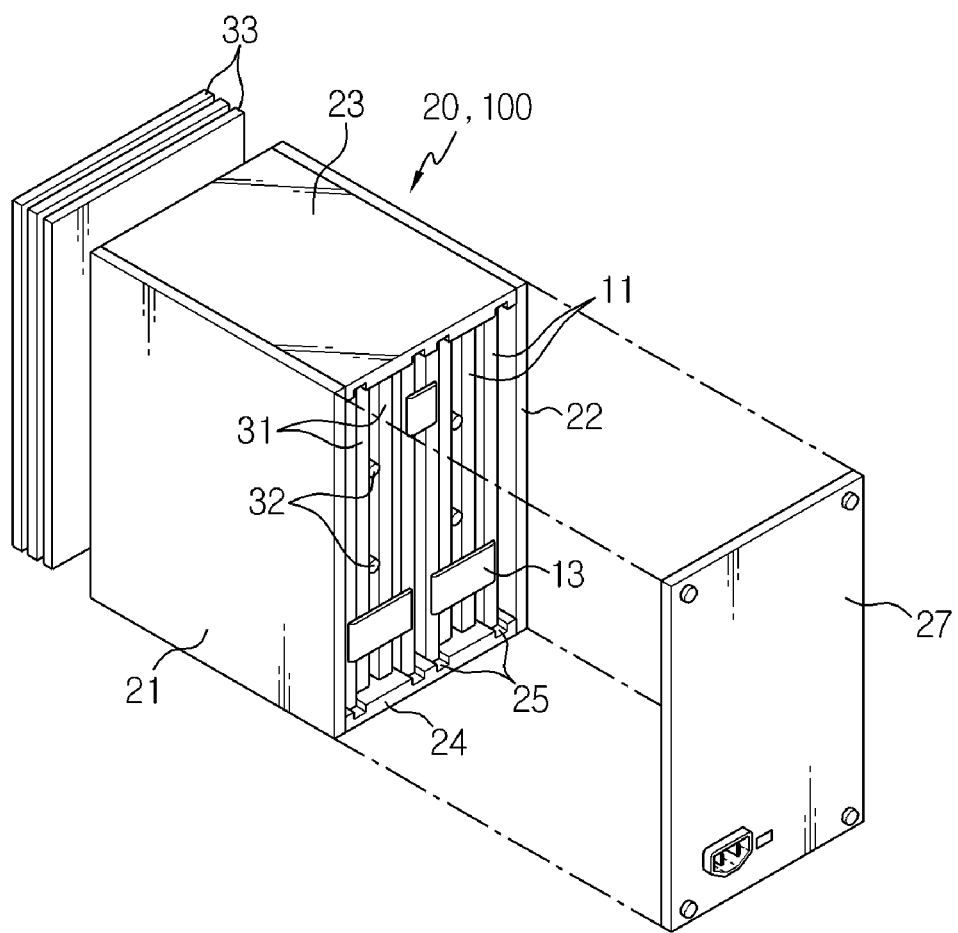
FIG. 4 is an exploded perspective view illustrating a battery pack including a battery module receiving apparatus of FIGS. 2 and 3.

Referring to FIGS. 2 to 4, the battery module receiving apparatus 20 according to an embodiment of the present invention has a rectangular parallelepiped shape having an inner space with open front and rear. The battery module receiving apparatus 20 has first and second side plates 21 and 22 provided opposite to each other to form the opposite side surfaces of the inner space, an upper plate 23 connecting the upper edges of the first and second side plates 21 and 22 to form the upper surface of the inner space, and a lower plate 24, opposite to the upper plate 23, connecting the lower edges of the first and second side plates 21 and 22 to form the lower surface of the inner space. Here, the first and second side plates 21 and 22, the upper plate 23, and the lower plate 24 are conceptually distinguished, and it is obvious that all or a part of these plates may be integrally formed.

A plurality of battery cell insertion slots 25 are formed on the lower surface of the upper plate 23 and the upper surface of the lower plate 24 at corresponding locations parallel to the first and second side plates 21 and 22 to erectly insert a plurality of battery cells 11.

Specifically, each of the upper plate 23 and the lower plate 24 has four battery cell insertion slots 25 on the surface facing the inner space, and the number of the battery cell insertion slots 25 may vary depending on the number of the battery cells 11 constituting the battery pack 100.

The battery cell insertion slots 25 start from the front end of the upper plate 23 and the lower plate 24 and end with a location spaced away from the rear end at a predetermined distance. This is so that the battery cells 11 can only be inserted through the front of the battery module receiving apparatus 20. In this embodiment, various modifications and variation can be made on the structure of the battery cell insertion slots 25 as long as the battery cell insertion slots 25 allow the battery cells 11 to be inserted from the front of the battery module receiving apparatus 20 and to be pushed close to the rear end. For example, the battery cell insertion slots 25 may extend over the length from the front end of the upper plate 23 and the lower plate 24 to the rear end, and a member such as a stopper may be provided at a location close to the rear end.

A plurality of heat transfer plate insertion slots 26 are formed adjacent to the battery cell insertion slots 25 on the lower surface of the upper plate 23 and the upper surface of the lower plate 24 at corresponding locations parallel to the first and second side plates 21 and 22 to erectly insert a plurality of first heat transfer plates 31 of the thermostat 30.

Specifically, each of the upper plate 23 and the lower plate 24 has four heat transfer plate insertion slots 26 on the surface facing the inner space, and two of the heat transfer plate insertion slots 26 are located between each pair of the battery cell insertion slots 25. Here, the heat transfer plate insertion slots 26 may vary in the number and arrangement.

Meanwhile, as opposed to the battery cell insertion slots 25, the heat transfer plate insertion slots 26 start from the rear end of the upper plate 23 and the lower plate 24 and end with a location spaced away from the front end at a predetermined distance. This is so that the first heat transfer plates 31 can only be inserted through the rear of the battery module receiving apparatus 20. Various modifications and variation can be made on the structure of the heat transfer plate insertion slots 26 as long as the heat transfer plate insertion slots 26 allow the first heat transfer plates 31 to be inserted from the rear of the battery module receiving apparatus 20 and to be pushed close to the front end.

Hereinafter, the battery module 10 and the battery module thermostat 30 to be received in the battery module receiving apparatus 20 are described in more detail.

The battery module 10 includes a plurality of the battery cells 11. In FIGS. 2 to 4, the battery cells 11 are shown as four, however various modifications and variation can be made on the number of the battery cells 11.

Each of the battery cells 11 is formed of a rectangular plate and may be a typical lithium secondary battery having a cathode plate and an anode plate with a separator interposed therebetween and an electrolyte filled therein. Also, the battery cell 11 may include a safety device or a control circuit to prevent ignition or explosion that may occur due to malfunction caused by overcharge and the like. In FIG. 2, the reference numeral 12 is an electrode terminal, that is, an electrode tab 12 of the battery cell 11. The size of the battery cell 11 is such that the battery cell 11 can be inserted into the battery cell insertion slots 25 of the upper plate 23 and the lower plate 24 of the battery module receiving apparatus 20, and when completely inserted, the electrode tab 12 may be exposed at a location spaced away a bit inwards from the front end of the battery module receiving apparatus 20.

To cool or heat a plurality of the battery cells 11 received in the battery module receiving apparatus 20, the thermostat 30 includes the first heat transfer plate 31, a heat pipe 32, and a second heat transfer plate 33.

When the first heat transfer plate 31 is inserted into the battery module receiving apparatus 20, the first heat transfer plate 31 contacts the surface of the battery cell 11 received in the battery module receiving apparatus 20 to exchange heat with the battery cell 11. The first heat transfer plate 31 is made of a metal having high heat conductivity, such as, for example, aluminum or copper, and the size is such that the first heat transfer plate 31 can be correctly inserted into the heat transfer plate insertion slots 26 of the upper plate 23 and the lower plate 24 of the battery module receiving apparatus 20.

The heat pipe 32 is attached to the surface of the first heat transfer plate 31 opposite to the contact surface with the surface of the battery cell 11 and extends to the outside of the battery module receiving apparatus 20 at the rear side. The heat pipe 32 is a hollow pipe filled with working fluid such as water and serves as a temperature controller to cool or heat a subject by a circulation mechanism, in which the working fluid is evaporated at a heat generation unit or a heat absorption unit and condensed at a heat dissipation unit, without the supply of a separate mechanical energy.

In FIGS. 2 to 4, two of the heat pipes 32 are inserted between each pair of the first heat transfer plates 31, however various modifications and variation can be made on the number of the heat pipes 32. Also, two of the heat transfer plates 31 are attached to both sides of the heat pipe 32, however only one heat transfer plate 31 may be attached to any one side of the heat pipe 32.

The second heat transfer plate 33 is connected to an end of the heat pipe 32 extending to the outside of the battery module receiving apparatus 20 at the outside of the battery module receiving apparatus 20 at the rear side to exchange heat with the air. Like the first heat transfer plate 31, the second heat transfer plate 33 is made of a metal having high heat conductivity, such as, for example, aluminum or copper. The second heat transfer plate 33 is connected to the end of the heat pipe 32 perpendicularly to the plane formed by the first heat transfer plate 31. In FIGS. 2 to 4, three of the second heat transfer plates 33 are spaced away a bit parallel to each other, however various modifications and variation can be made on the number of the second heat transfer plates 33. Also, the second heat transfer plate 33 may have a heat dissipation pin or a heat absorption pin on the surface thereof to improve the efficiency of heat exchange with the air.

Subsequently, a process for receiving the battery module 10 in the battery module receiving apparatus 20 to implement the battery pack 100 and connecting the first heat transfer plate 31 and the heat pipe 32 of the thermostat 30 to the battery pack 100 is described below in more detail.

As described above, the battery module 10 is inserted through the front of the battery module receiving apparatus 20, and the first heat transfer plate 31 and the heat pipe 32 are inserted through the rear of the battery module receiving apparatus 20. Also, as shown in FIG. 3, the battery cell insertion slots 25 are formed to receive each pair of the battery cells 11 at left and right sides and the heat transfer plate insertion slots 26 are formed between the battery cell insertion slots 25 to receive each pair of the first heat transfer plates 31 at left and right sides. The battery cell insertion slots 25 and the heat transfer plate insertion slots 26 are located adjacent to each other.

Accordingly, as shown in FIG. 3, the battery cells 11 are inserted into the battery cell insertion slots 25 through the front of the battery module receiving apparatus 20 and pushed close to the rear, and the first heat transfer plates 31 of the thermostat 30 are inserted into the heat transfer plate insertion slots 26 through the rear of the battery module receiving apparatus 20 and pushed to the front. Then, as shown in FIG. 4, the battery pack 100 is implemented in which the battery module 10 is received in the inner space of the battery module receiving apparatus 20. Next, the first heat transfer plate 31 and the heat pipe 32 of the thermostat 30 is received in the inner space of the battery module receiving apparatus 20. The first heat transfer plates 31 closely contact the surfaces of the battery cells 11. Next, the electrode tabs 12 of the battery cells 11 are connected and bus bars 13 are applied, so that the battery cells 11 are connected in series or in parallel.

Subsequently, optionally, the front plate 27 serving as a front cover may be connected to the front of the battery module receiving apparatus 20. The front plate 27 may have a consent as an output terminal of the battery pack 100, an indicating lamp for indicating the state of the battery cells 11 or the battery module 10 of the battery pack 100, a control terminal connector for controlling the battery cells 11 or the battery module 10, and the like.

Although this embodiment shows that an output terminal or a control terminal of the battery pack 100 is arranged at the front of the battery pack 100, the output terminal or control terminal may be arranged at the rear of the battery pack 100, and further at the rear of the power storage system. In this case, a wire for bypass directed to the rear is formed through the second heat transfer plate 33, if necessary.

According to the battery module receiving apparatus 20 and the thermostat 30 of this embodiment, the battery pack 100 can be implemented by a simple operation of pushing the battery module 10 from the front to the rear of the battery module receiving apparatus 20 and the thermostat 30 from the rear to the front of the battery module receiving apparatus 20, and maintenance and repair can also be easily conducted by replacing a specific battery cell or thermostat component.

The battery pack 100 according to the present invention described above may be used very suitably in implementing a stack-type power storage system.

Hereinafter, a stack-type power storage system including a plurality of the battery packs 100 is described with reference to FIGS. 5 and 6. A plurality of the battery modules 10 are respectively received in a plurality of the battery module receiving apparatuses 20 and the thermostat 30 is connected to the battery packs 100. In this instance, only the disclosure different from the embodiment of FIGS. 2 to 4 is described below.

Figure 5:
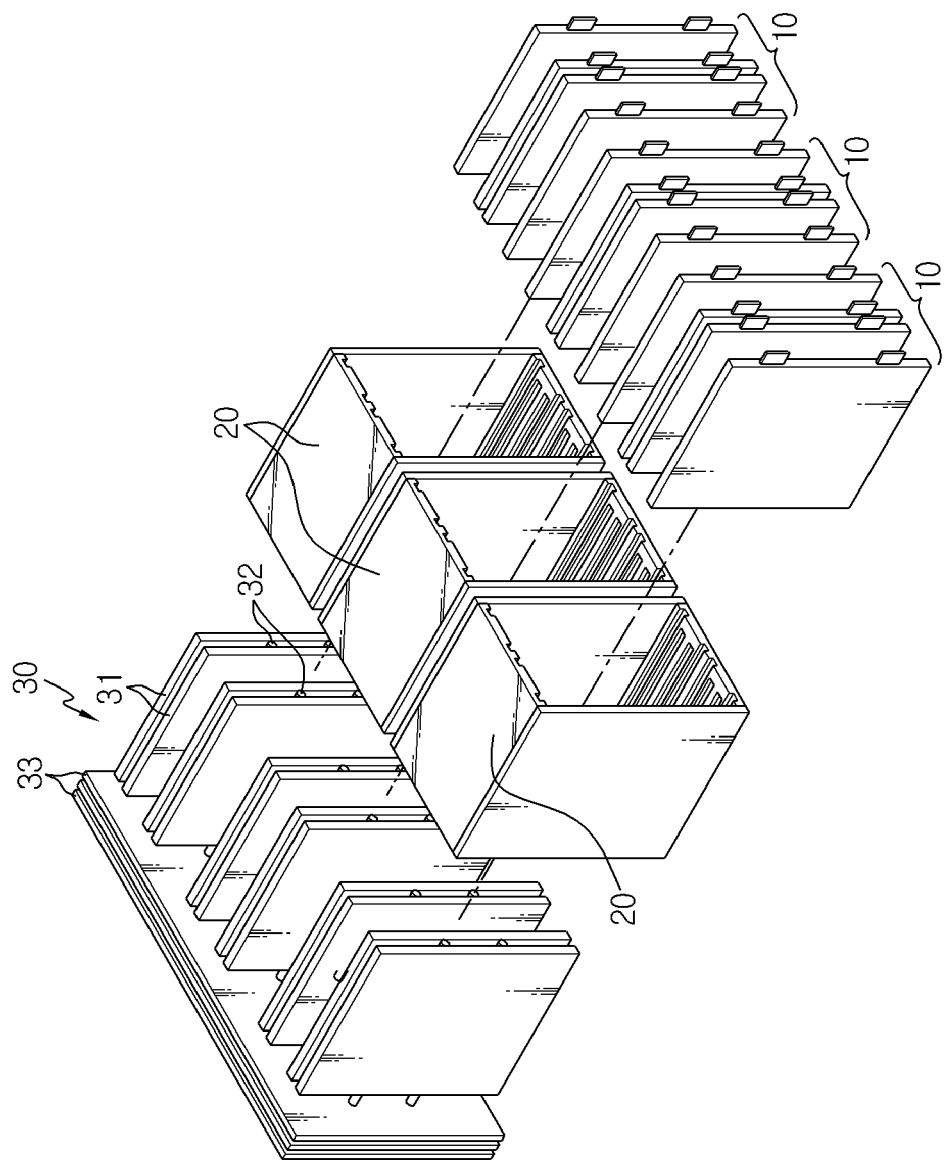
FIG. 5 is an exploded perspective view illustrating a plurality of battery packs including a plurality of battery module receiving apparatuses according to an embodiment of the present invention.
Figure 6:
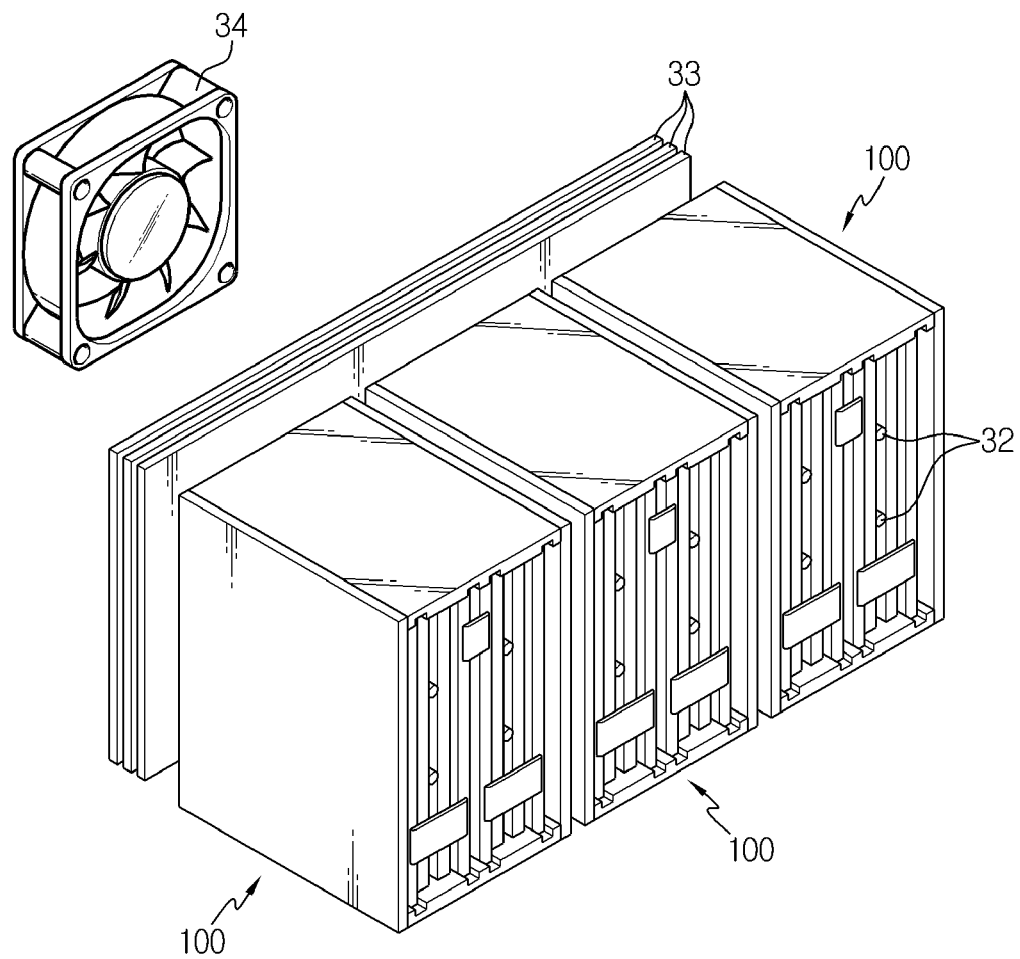
FIG. 6 is an assembled perspective view of FIG. 5.

In FIGS. 5 and 6, a plurality of the battery packs 100 are implemented using a plurality of, for example, three battery module receiving apparatuses 20. However, modification and variation may be made on the number of the battery module receiving apparatuses 20. Since the battery module receiving apparatus 20 and the battery module 10 of this embodiment are the same as those of the previous embodiment, the detailed description is omitted herein.

According to this embodiment, the battery packs 100 are plural but there is only one thermostat 30 in common to the plural battery packs 100. In other words, two pairs of the first heat transfer plates 31 and two pairs of the heat pipes 32 are provided to each of three battery packs 100, that is, six pairs of the first heat transfer plates 31 and six pairs of the heat pipes 32 in total, while the singular second heat transfer plate 33 having a size sufficient to entirely cover the three battery packs 100 is provided. Here, the 'singular' second heat transfer plate 33 means that the second heat transfer plate 33 is in common to a plurality of the battery packs 100. The second heat transfer plate 33 may be plural. Accordingly, it is possible to uniformly control the temperature between the battery packs 100 as well as the temperature between the battery cells 11.

A process for receiving a plurality of the battery modules 10 in a plurality of the battery module receiving apparatuses 20 respectively to implement a plurality of the battery packs 100 and connecting a plurality of the first heat transfer plates 31 and a plurality of the heat pipes 32 of the thermostat 30 to a plurality of the battery packs 100 is basically the same as the previous embodiment. Although not shown in FIGS. 5 and 6, when the battery pack case 200 is used to receive a plurality of the battery packs 100 at each stair as shown in FIG. 1, the stack-type power storage system is implemented by inserting a plurality of the battery modules 10, receiving a plurality of the battery packs 100 in the battery pack case 200, and simultaneously inserting a plurality of the first heat transfer plates 31 and a plurality of the heat pipes 32 of one common thermostat 30 into a plurality of the battery packs 100, in particular, a plurality of the battery module receiving apparatuses 20 at the rear side of the system. In this instance, although FIGS. 5 and 6 show one stair of three battery packs 100, when the number of the stairs of the battery packs 100 are three as shown in FIG. 1, the first heat transfer plates 31 and the heat pipes 32 of the thermostat 30 triple in number in the longitudinal direction, and the size of the second heat transfer plate 33 increases three times in the longitudinal direction.

In FIG. 6, the reference numeral 34 is a fan to supply air to the second heat transfer plate 33. The fan 34 is installed at a proper location in a housing (not shown) that entirely surrounds the power storage system to supply air to the second heat transfer plate 33. Also, although not shown, a heater may be installed in front of the fan 34 to supply hot air to the second heat transfer plate 33 when heating is required. To improve the efficiency of heat exchange with the air, the fan 34 and the second heat transfer plate 33 may be arranged outside of the housing rather than within the housing.

In the power storage system described above, when the battery cell 11 generates heat, the heat is transmitted to the heat pipe 32 through the first heat transfer plate 31 contacting the surface of the battery cell 11. When the working fluid in the heat pipe 32 evaporates, the working fluid moves to the second heat transfer plate 33 that is relatively cool, and is then condensed. Next, the working fluid moves to the first heat transfer plate 31 again. Accordingly, the battery cell 11 is cooled by the circulation of the working fluid. On the other hand, when the temperature of the battery cell 11 is relatively low, for example, at cold start, the battery cell 11 is heated as opposed to the above cooling operation.

Accordingly, it is possible to constantly maintain the temperature of the battery cells 11 of the power storage system at a uniform level. Also, it is possible to uniformly maintain the temperature between the battery cells 11 and between the battery packs 100 by applying the first heat transfer plates 31 and the heat pipes 32 of the same structure to all the battery cells 11 and providing the common second heat transfer plate 33 having a size sufficient to entirely cover the system.

Subsequently, a modified example of the thermostat 30 described with reference to FIGS. 2 to 6 is described below.

Figure 7:
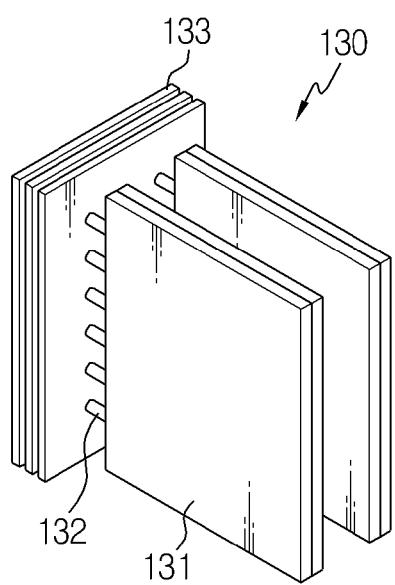
FIG. 7 is a view illustrating a modified example of the thermostat of FIG. 2.
Figure 7:
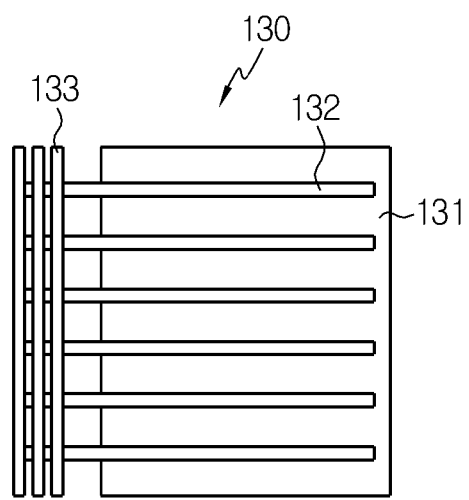
Figure 7:
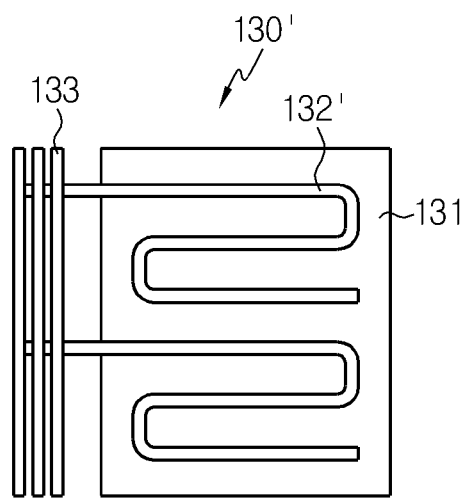

The thermostat 30 of FIG. 2 has a pair of the first heat transfer plate 31 spaced away from each other at a distance equal to an outer diameter of the heat pipe 32 with the heat pipe 32 interposed therebetween. According to a modified example of FIG. 7, a thermostat 130 includes a pair of first heat transfer plates 131 contacting each other without a gap therebetween, as shown in FIG. 7(a). As shown in FIG. 7(b) showing a cross-sectional view exclusive of one of the first heat transfer plates 131, the first heat transfer plates 131 have a plurality of grooves of a semicircular cross section formed on the facing surfaces into which heat pipes 132 are introduced. In this instance, the shape of the grooves and the shape of the heat pipes depending on the shape of the grooves may vary, for example, a zigzag shape as shown in (c) of FIG. 7.

When compared with the thermostat 30 of FIG. 2, the thermostat 130 can reduce the overall thickness of the first heat transfer plates 131, thereby contributing to the minimization in the battery pack and the power storage system.

Figure 8:
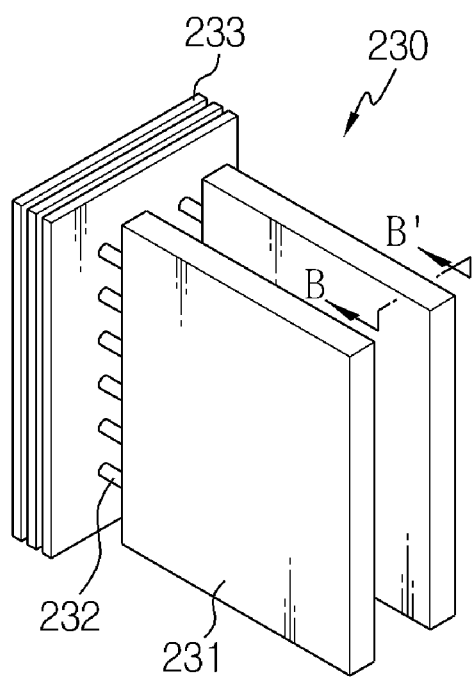
FIG. 8 is a view illustrating another modified example of the thermostat of FIG. 2.
Figure 8:
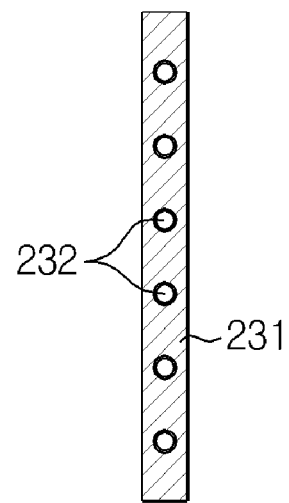

The thermostat 30 and 130 of FIGS. 2 and 7 has a pair of the first heat transfer plates 31 and 131 with the heat pipes 32 and 132 interposed therebetween. According to another modified example of FIG. 8, a thermostat 230 includes one heat transfer plate 231 having a plurality of heat pipes 232 inserted therein. As shown in FIG. 8(a) and FIG. 8(b) showing a cross-sectional view taken along the line B-B' of FIG. 8(a), a plurality of holes are formed in the first heat transfer plate 231 parallel to each other, into which the heat pipes 232 are inserted. Like the thermostat 130 of FIG. 7, the thermostat 230 can reduce the overall thickness of the first heat transfer plate 231 when compared with the thermostat 30 of FIG. 2, thereby achieving the minimization in the battery pack and the power storage system.

Figure 9:
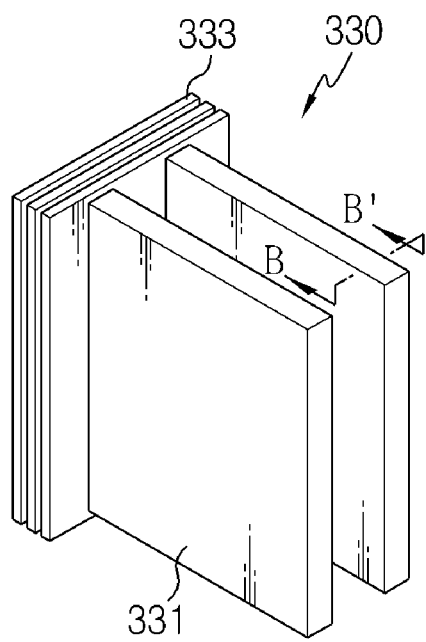
FIG. 9 is a view illustrating still another modified example of the thermostat of FIG. 2.
Figure 9:
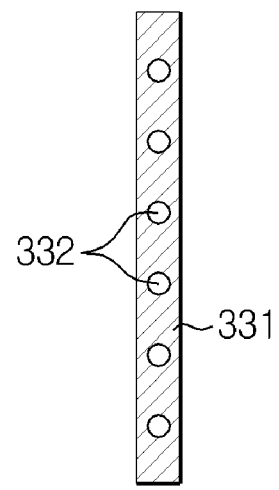

According to still another modified example of FIG. 9, like the thermostat 230 of FIG. 8, thermostat 330 includes one first heat transfer plate 331 having a plurality of holes 332 formed therein parallel to each other. However, the thermostat 330 has heat pipes formed by filling a plurality of the holes 332 with a working fluid, without the use of a pipe intended for a heat pipe. Accordingly, when compared with the thermostat 30 of FIG. 2, the thermostat 330 can reduce the overall thickness of the first heat transfer plate 331, thereby achieving the minimization in the battery pack and the power storage system. Also, the thermostat 330 eliminates the need of a separate component for a heat pipe, thereby reducing the number of the components.

Subsequently, a battery module receiving apparatus, a thermostat, and a power storage system according to another embodiment of the present invention is described below.

Figure 10:
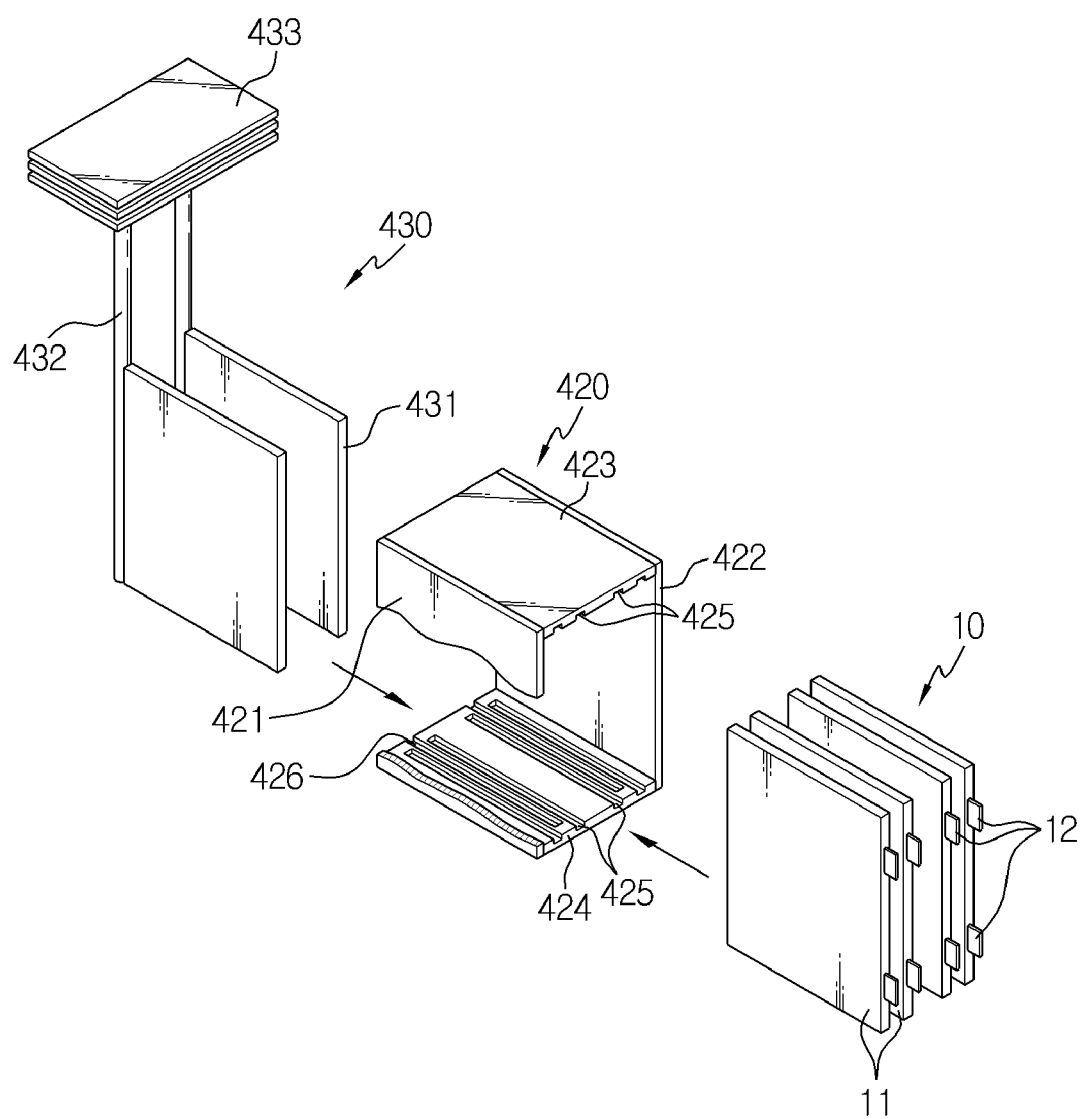
FIG. 10 is a partial cut-away exploded perspective view illustrating a battery module receiving apparatus for receiving a battery module and a thermostat according to another embodiment of the present invention.
Figure 11:
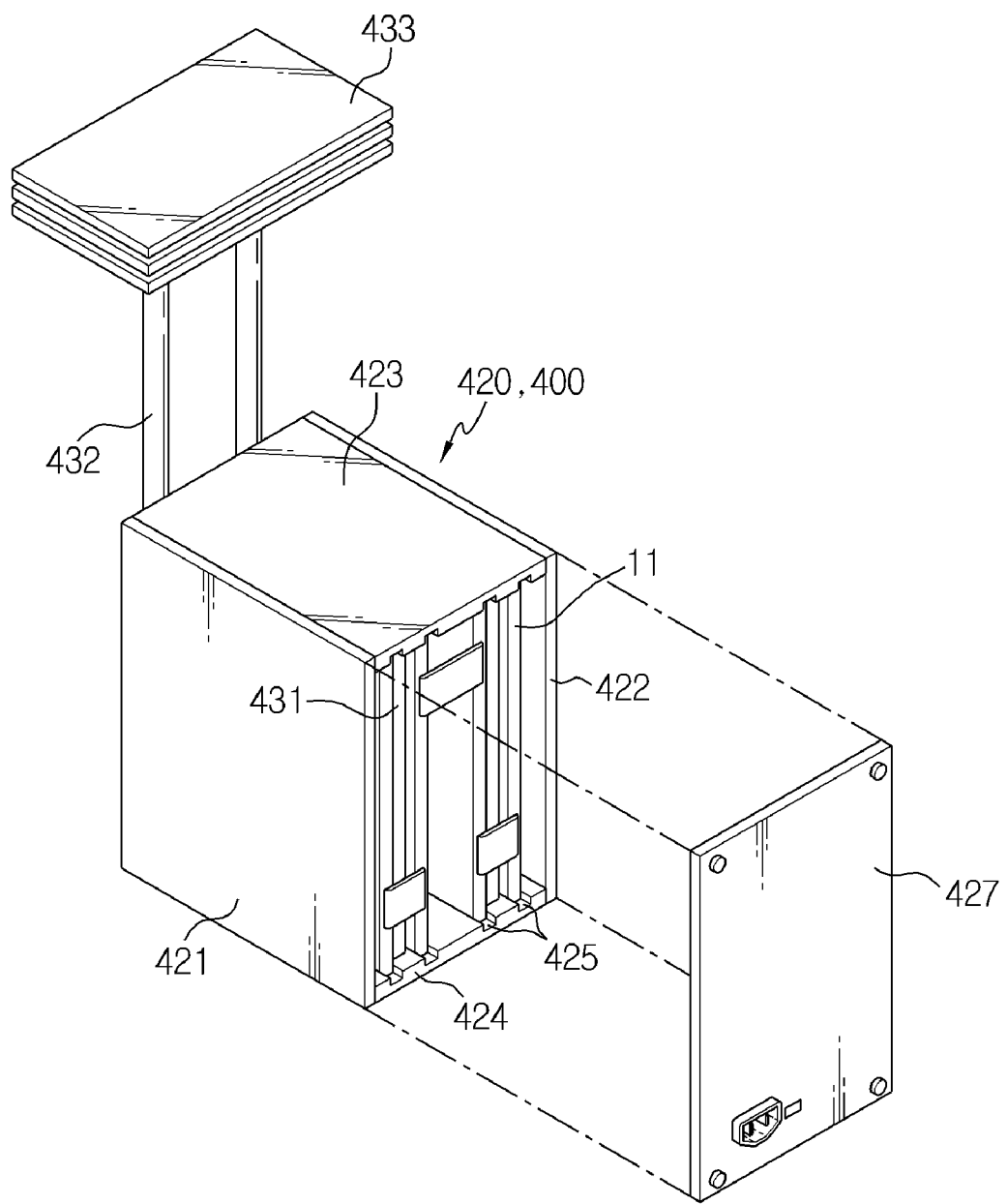
FIG. 11 is an exploded perspective view illustrating a battery pack including the battery module receiving apparatus of FIG. 10.

FIG. 10 is a partial cut-away exploded perspective view illustrating a battery module receiving apparatus for receiving a battery module and a thermostat according to another embodiment of the present invention. FIG. 11 is an exploded perspective view illustrating a battery pack including the battery module receiving apparatus of FIG. 10. Here, the same reference numeral indicates the same component or element, and only the disclosure different from the previous embodiment is described below.

Referring to FIGS. 10 and 11, a battery module receiving apparatus 420 has a rectangular parallelepiped shape, like the battery module receiving apparatus 20 of the previous embodiment. Likewise, the battery module receiving apparatus 420 has first and second side plates 421 and 422, an upper plate 423, and a lower plate 424. Here, the first and second side plates 421 and 422, the upper plate 423, and the lower plate 424 are conceptually distinguished, and it is obvious that all or a part of these plates may be integrally formed.

Like the previous embodiment, a plurality of battery cell insertion slots 425 and a plurality of heat transfer plate insertion slots 426 are formed on the lower surface of the upper plate 423 and the upper surface of the lower plate 424 at corresponding locations parallel to the first and second side plates 421 and 422. A plurality of the battery cell insertion slots 425 start from the front end of the battery module receiving apparatus 420 and end with a location spaced away from the rear end at a predetermined distance so that a plurality of the battery cells 11 can only be inserted through the front of the battery module receiving apparatus 420. A plurality of the heat transfer plate insertion slots 426 start from the rear end of the battery module receiving apparatus 420 and end with a location spaced away from the front end at a predetermined distance so that a plurality of the first heat transfer plates 431 can only be inserted through the rear of the battery module receiving apparatus 420.

Specifically, four battery cell insertion slots 425 are formed on the lower surface of the upper plate 423 and the upper surface of the lower plate 424. In this instance, the battery cell insertion slots 425 may arbitrarily vary in number and arrangement depending on the number and arrangement of the battery cells 11 constituting the battery pack 400. One of the heat transfer plate insertion slot 426 is formed between each pair of adjacent battery cell insertion slots 425 on the lower surface of the upper plate 423 and the upper surface of the lower plate 424, that is, two of the heat transfer plate insertion slots 426 in total. In this instance, the heat transfer plate insertion slots 426 may also vary in number and arrangement.

The thermostat 430 includes a first heat transfer plate 431, a heat pipe 432, and a second heat transfer plate 433.

The first heat transfer plate 431 is substantially the same as the first heat transfer plate 31 of the previous embodiment. When the first heat transfer plate 431 is inserted into the battery module receiving apparatus 420, the first heat transfer plate 431 contacts the surfaces of the battery cells 11 to exchange heat with the battery cells 11.

The heat pipe 432 is a hollow pipe filled with working fluid such as water and attached to one side of the first heat transfer plate 431, for example, via welding. Specifically, the heat pipe 432 is attached to one side of the first heat transfer plate 431 at the rear side parallel to one side of the first heat transfer plate 431 in the longitudinal direction, that is, the heat pipe 432 extends vertically at the outside of the battery module receiving apparatus 420 at the rear side. Also, the heat pipe 432 further extends upwards at the outside of the battery module receiving apparatus 420 at the rear side.

In FIGS. 10 and 11, one of the first heat transfer plate 431 is provided between each pair of adjacent batter cells 11, that is, two of the heat transfer plates 431 in total, and the heat pipe 432 is connected to one side of the first heat transfer plate 431, however various modifications and variation can be made on the number of the first heat transfer plates 431 and the heat pipes 432. For example, like the previous embodiment, two of the first heat transfer plates 431 may be arranged between a pair of adjacent battery cells 11. Alternatively, one of the first heat transfer plate 431 may be arranged between all of the adjacent battery cells 11. In this case, the heat transfer plate insertion slots 426 formed on the surfaces of the upper and lower plates 423 and 424 of the battery module receiving apparatus 420 may also vary in number and arrangement depending on the number and arrangement of the first heat transfer plates 431.

The second heat transfer plate 433 is connected to an end of the heat pipe 432 extending above the battery module receiving apparatus 420 at the outside of the battery module receiving apparatus 420 at the rear side to exchange heat with the air. The second heat transfer plate 433 is connected to the end of the heat pipe 432 perpendicularly to the plane formed by the first heat transfer plate 431 and the longitudinal direction of the heat pipe 432. The second heat transfer plate 433 is the same as that of the previous embodiment in material, shape, and number. Also, the second heat transfer plate 433 may have a heat dissipation pin or a heat absorption pin on the surface thereof to improve the efficiency of heat exchange with the air.

Since the battery module 10 inserted into the battery module receiving apparatus 420 and the battery cells 11 constituting the battery module 10 are the same as those of the previous embodiment, the detailed description is omitted herein.

Like the previous embodiment, according to the battery module receiving apparatus 420, the battery module 10, and the thermostat 430 of this embodiment, the battery pack 400 is implemented by inserting the battery module 10 through the front of the battery module receiving apparatus 420 and the thermostat 430 through the rear of the battery module receiving apparatus 420. In other words, as shown in FIG. 11, the battery module 10 is received in the inner space of the battery module receiving apparatus 420 to implement the battery pack 400, and the first heat transfer plate 431 of the thermostat 430 is received in the inner space of the battery module receiving apparatus 420. The first heat transfer plate 431 closely contact the surfaces of the battery cells 11. Also, the electrode tabs 12 of the battery cells 11 are connected and bus bars 13 are applied, so that the battery cells 11 are connected in series or in parallel. Optionally, the front plate 427 serving as a front cover of the battery module receiving apparatus 420 may be connected to the front of the battery module receiving apparatus 420. Since the front plate 427 is substantially the same as the front plate 27 of the previous embodiment, the detailed description is omitted herein.

According to the battery module receiving apparatus 420 and the thermostat 430 of this embodiment, the battery pack 400 may be implemented by a simple operation of pushing the battery module 10 from the front to the rear of the battery module receiving apparatus 420 and pushing the thermostat 30 from the rear to the front of the battery module receiving apparatus 420, and maintenance and repair can also be easily conducted by replacing a specific battery cell or thermostat component.

Like the previous embodiment, a plurality of the battery packs 400 may be assembled into a power storage system. That is, a power storage system may be implemented by receiving a plurality of the battery modules 10 in the battery module receiving apparatus 420 to implement a plurality of the battery packs 400 and connecting the thermostat 430 to a plurality of the battery packs 400. The detailed description is given below with reference to FIGS. 12 and 13 showing the perspective views.

Figure 12:
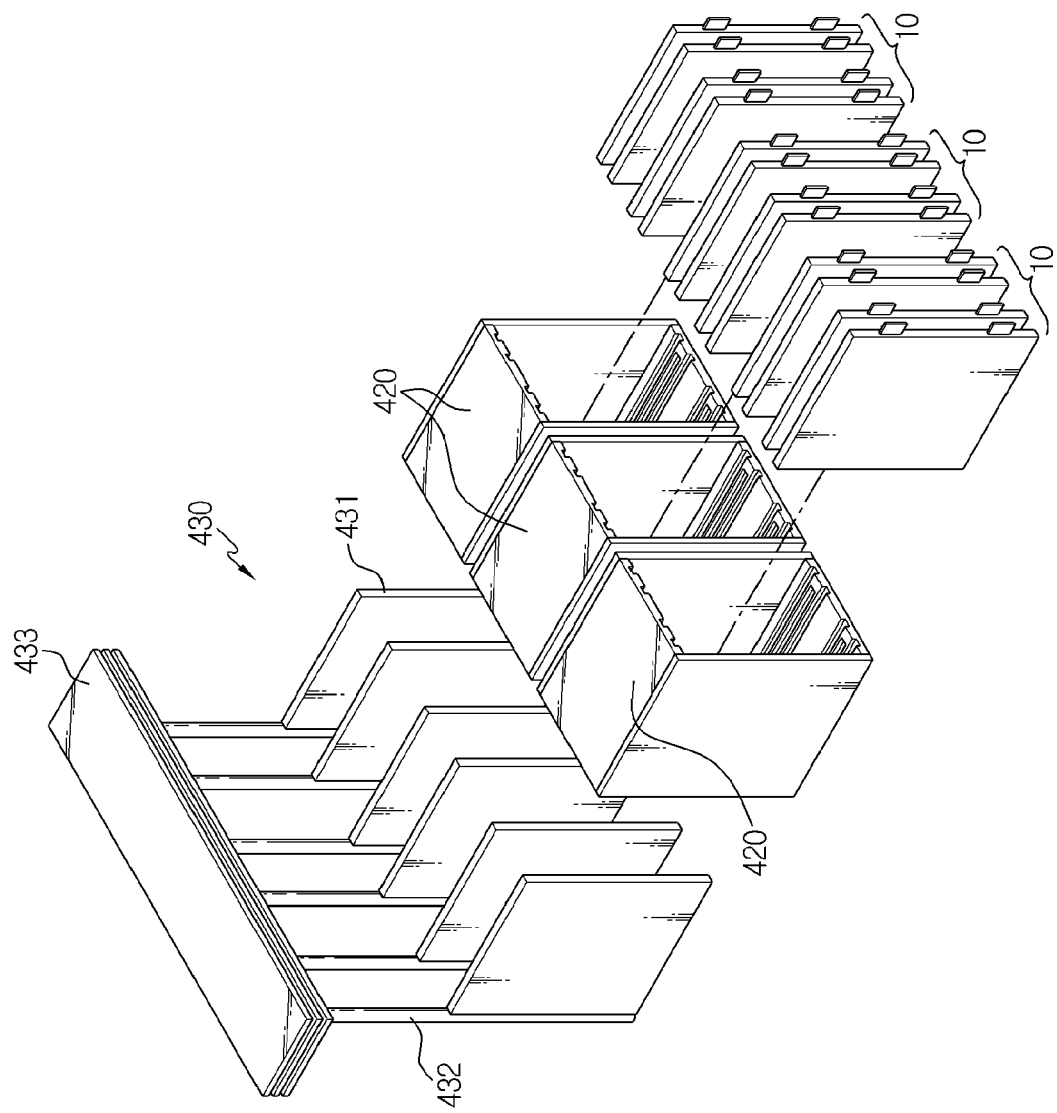
FIG. 12 is an exploded perspective view illustrating a plurality of battery packs including a plurality of battery module receiving apparatuses according to another embodiment of the present invention.
Figure 13:
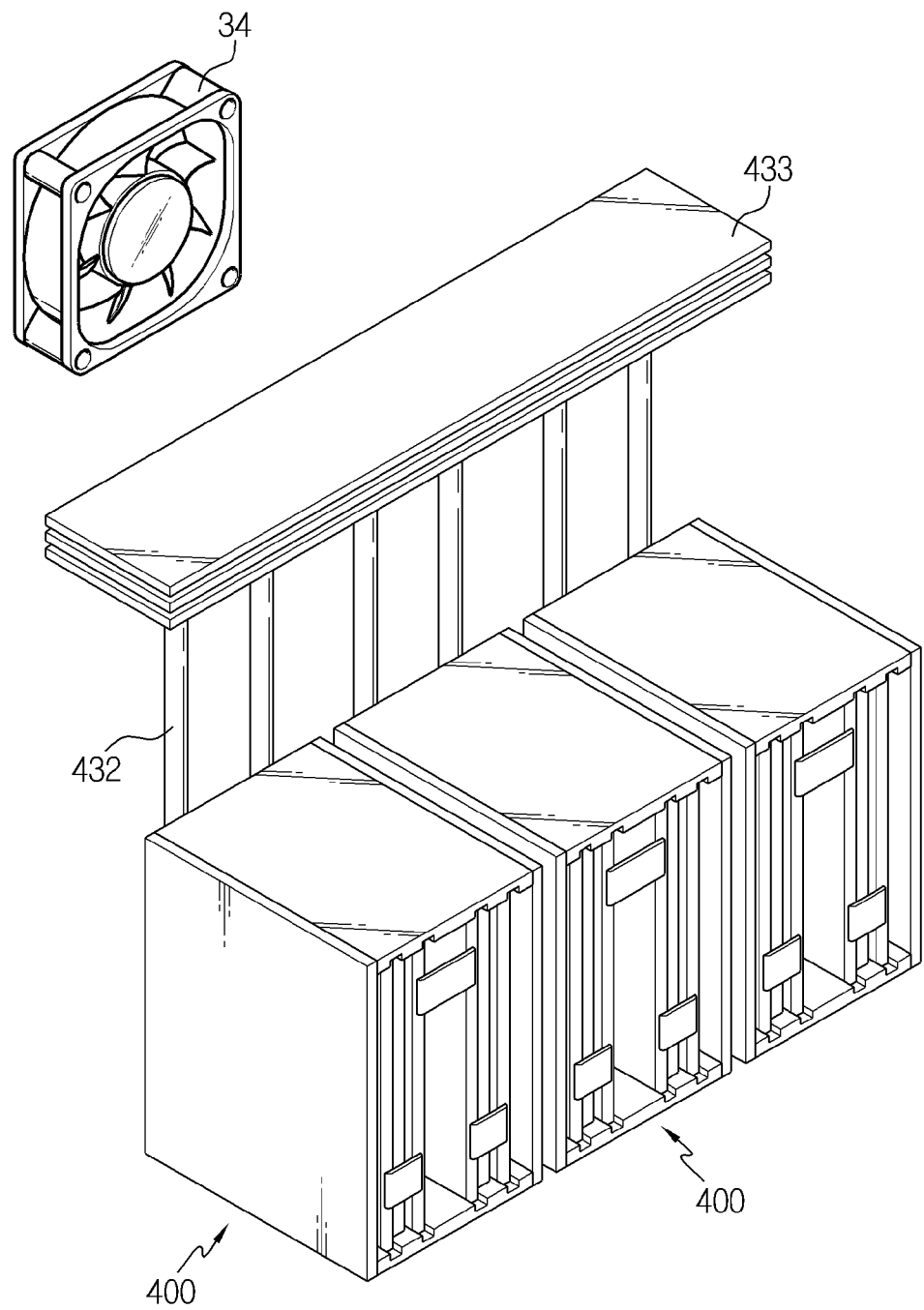
FIG. 13 is an assembled perspective view of FIG. 12.

As shown in FIGS. 12 and 13, the power storage system includes a plurality of the battery packs 400 and a single thermostat 430 that is in common to a plurality of the battery packs 400. Specifically, two pairs of the first heat transfer plates 431 and two pairs of the heat pipes 432 are provided to each of three battery pack 400, that is, six of the first heat transfer plates 431 and six of the heat pipes 432 in total, while the singular second heat transfer plate 433 having a size sufficient to entirely cover the three battery packs 400 is provided. Here, the 'singular' second heat transfer plate 433 means that the second heat transfer plate 433 is in common to a plurality of the battery packs 400. The second heat transfer plate 433 may be plural. Accordingly, it is possible to uniformly control the temperature between the battery packs 400 as well as between the battery cells 11. Like the previous embodiment, a fan for air supply or a heater may be installed.

Subsequently, a modified example of the thermostat 430 is described below with reference to FIGS. 14 to 16.

In the thermostat 430, as shown in FIG. 10, a connection between the first heat transfer plate 431 and the heat pipe 432 is established by attaching the heat pipe 432 to one side of the first heat transfer plate 431, for example, via welding. According to a modified example of FIG. 14, a connection between a first heat transfer plate 531 and a heat pipe 532 of a thermostat 530 is established by bending the first heat transfer plate 531 comprising one plate-like member to surround the heat pipe 532 as shown in FIG. 14(a) and FIG. 14(b) showing a bottom view from the arrow B of FIG. 14(a). Accordingly, this connection established by bending the plate-like member 531 to surround the heat pipe 532 is more uniform and stable than the connection established via welding.

Figure 14:
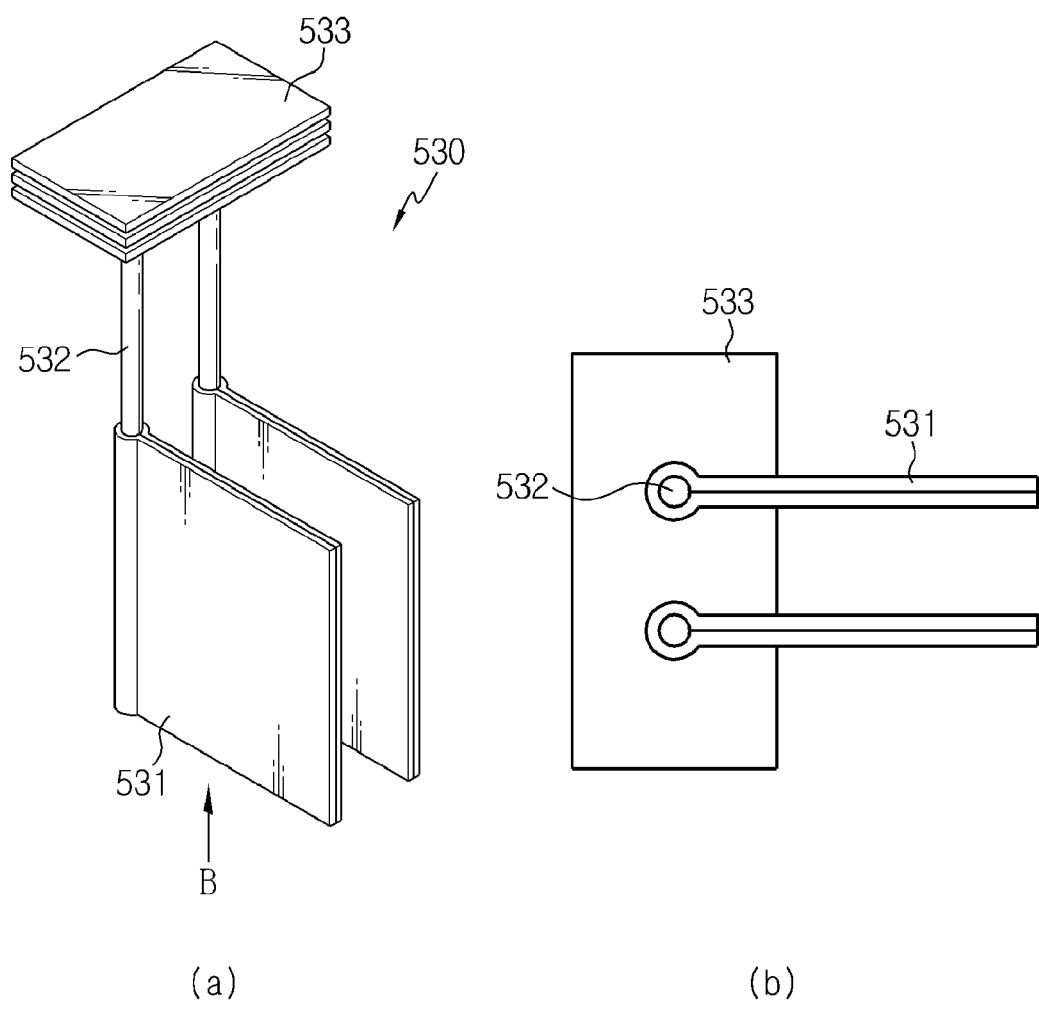
FIG. 14 is a view illustrating a modified example of the thermostat of FIG. 10.
Figure 15:
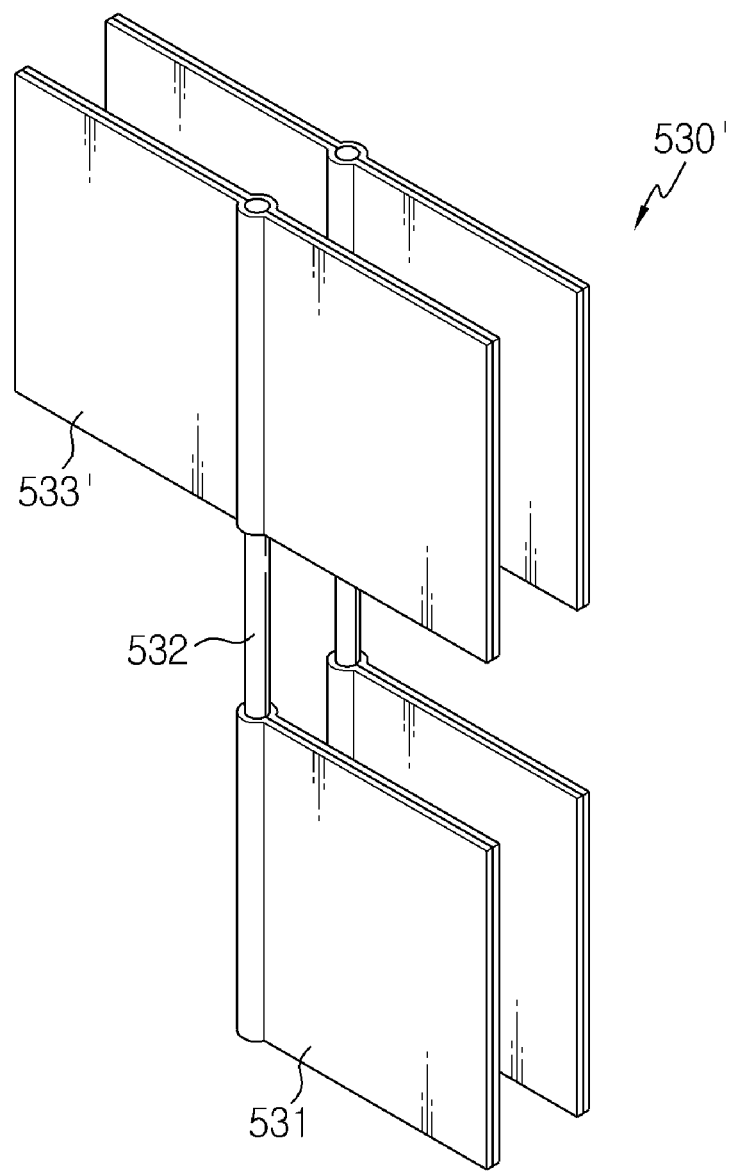
FIG. 15 is a view illustrating another modified example of the thermostat of FIG. 10.

Referring to FIG. 15, a thermostat 530' is similar to the thermostat 430 of FIG. 14, but there is a difference in that a connection between a second heat transfer plate 533' and a heat pipe 532 is established by surrounding the second heat transfer plate 533' comprising a plate-like member around the heat pipe 532. Although FIG. 15 shows the second heat transfer plate 533' comprising two joined plate-like members surrounding the heat pipe 532 to establish a connection therebetween, the second heat transfer plate 533' may comprise one plate-like member like a first heat transfer plate 531.

Figure 16:
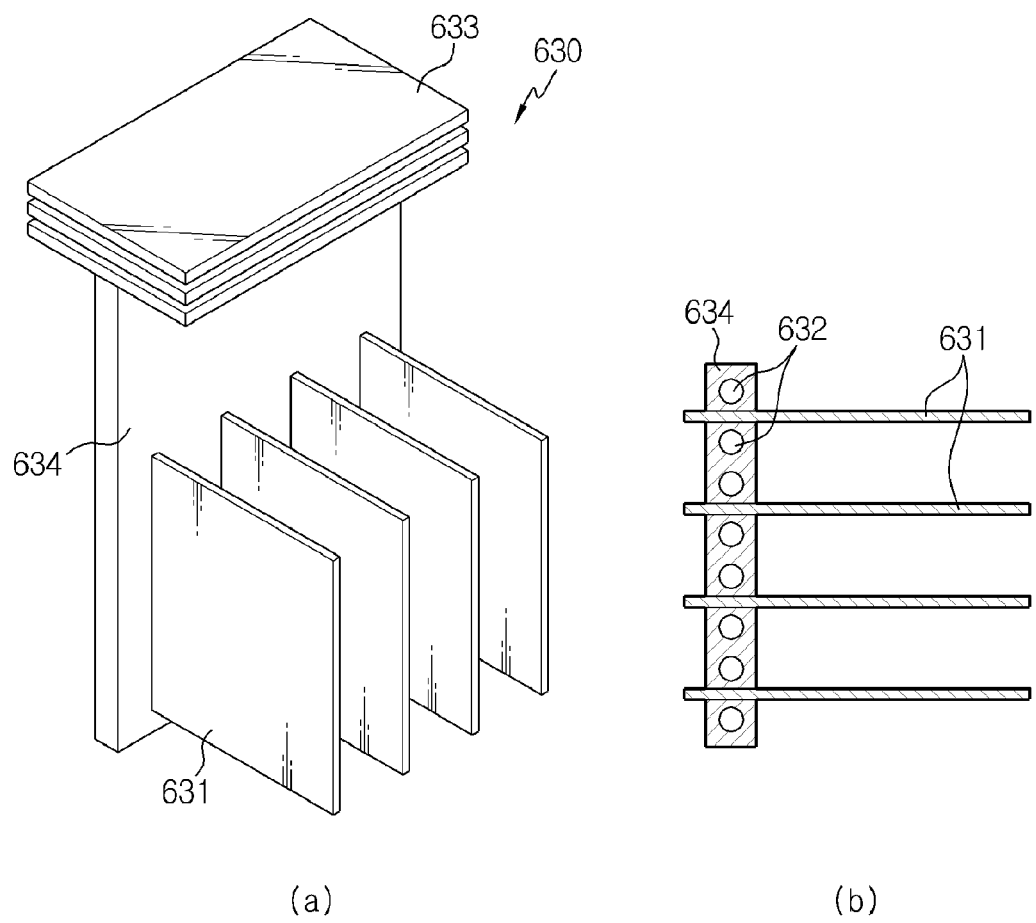
FIG. 16 is a view illustrating still another modified example of the thermostat of FIG. 10.

According to a modified example of FIG. 16, one plate-like member 634 of a thermostat 630 replaces a plurality of the heat pipes 432 of the thermostat 430 of FIG. 10. As shown in FIG. 16(a), modifications are made on connection structures between the plate-like member 634 and a first heat transfer plate 631 and between the plate-like member 634 and a second heat transfer plate 633. Specifically, as shown in FIG. 16(b) showing a cross-sectional view taken along the horizontal line of FIG. 16(a), a heat pipe comprises the plate-like member 634 having a plurality of holes 632 formed therein parallel to each other. Also, the plate-like member 634 has slots between a plurality of the holes 632 of the plate-like member 634 formed therein, into which the first heat transfer plate 631 is inserted to establish a connection with the heat pipe. Alternatively, the first heat transfer plate 631 and the plate-like member 634 may be integrally formed.

In the thermostat 630, a connection between the first heat transfer plate 631 and the heat pipe can be established by a simple operation of inserting the first heat transfer plate 631 into the slots, resulting in simple assembly. Also, when the first heat transfer plate 631 and the plate-like member 634 are integrally formed, the need of a connection therebetween is eliminated, which makes it simple to manufacture the entire system.

Subsequently, a thermostat 730 and a power storage system according to still another embodiment is described below with reference to FIGS. 17 to 19.

Figure 17:
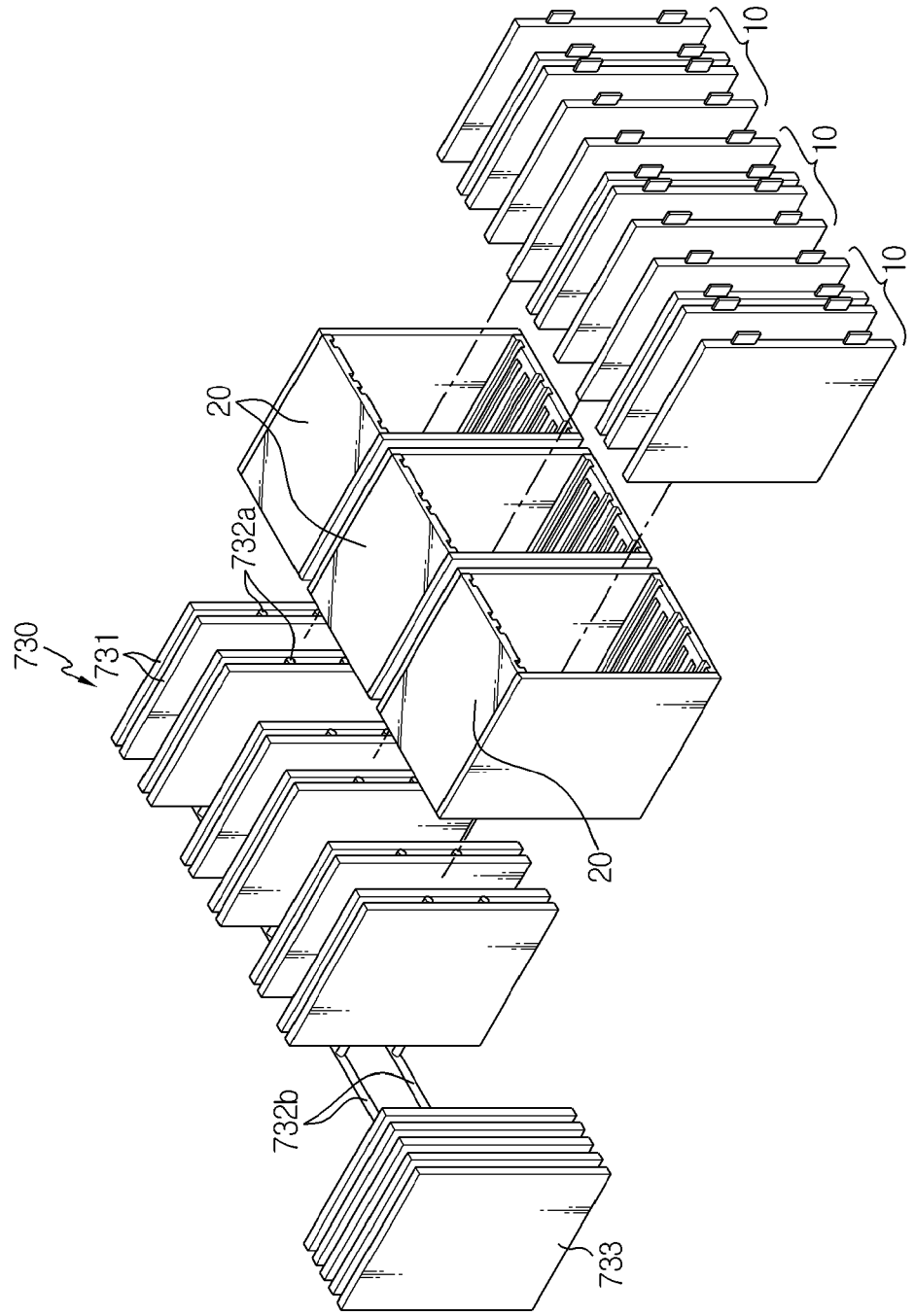
FIG. 17 is an exploded perspective view illustrating a plurality of battery packs including a plurality of battery module receiving apparatuses according to still another embodiment of the present invention.
Figure 18:
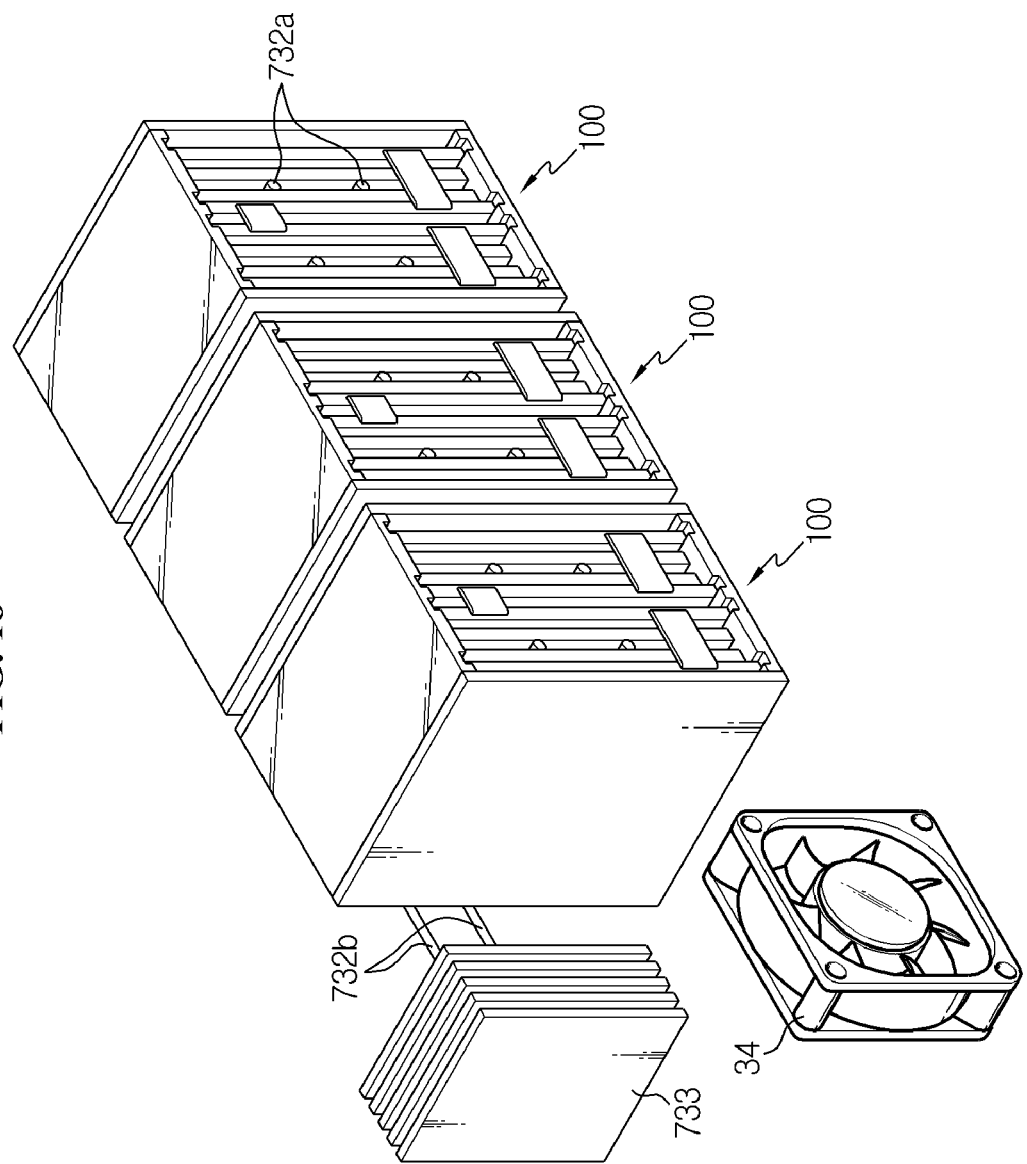
FIG. 18 is an assembled perspective view of FIG. 17.
Figure 19:
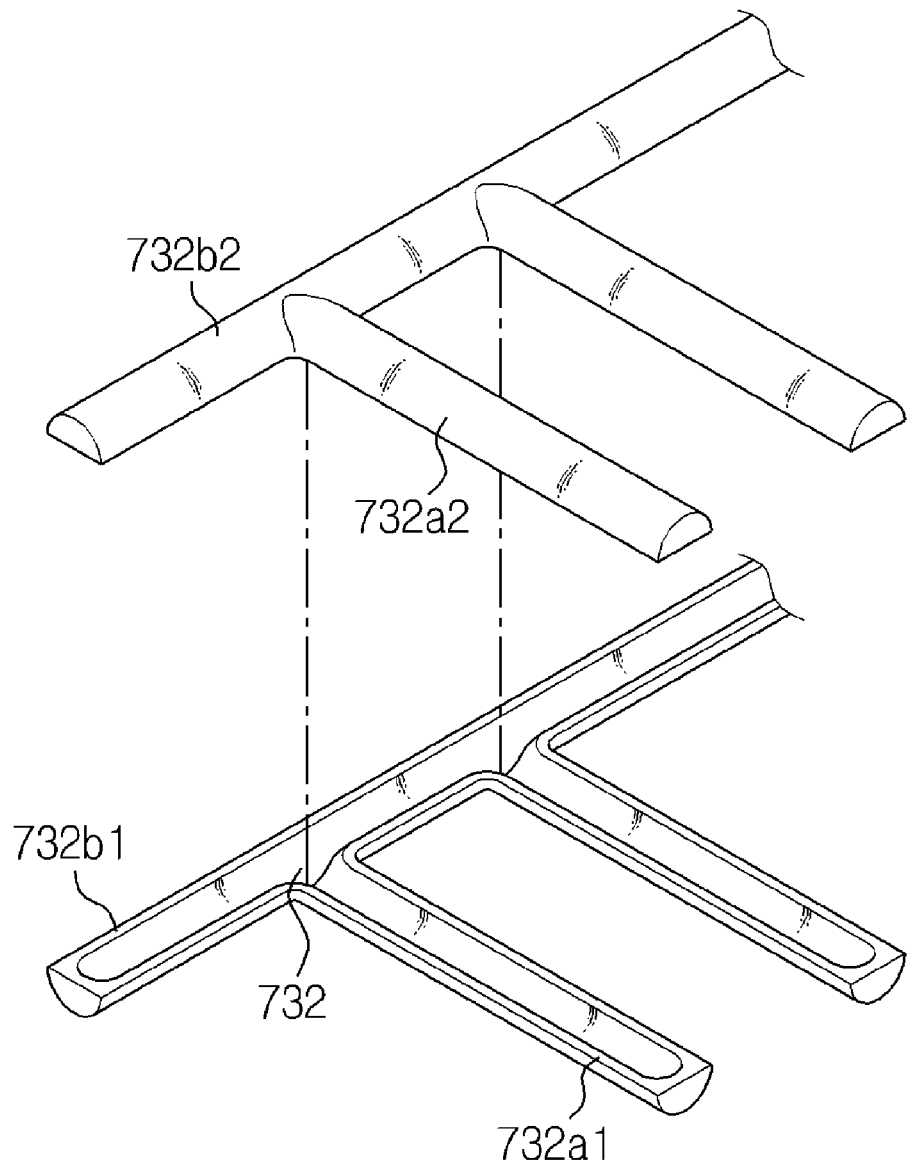
FIG. 19 is a partial cut-away exploded perspective view illustrating a heat pipe of the thermostat of FIG. 17.

As shown in FIGS. 17 and 18, this embodiment is substantially the same as the embodiment of FIGS. 5 and 6 above, except that modification is made on a connection structure of a thermostat, in particular, a heat pipe and a second heat transfer plate. Accordingly, the following description focuses on the thermostat 730, and the detailed description of the battery module 10 and the battery module receiving apparatus 20 is omitted herein.

According to this embodiment, the thermostat 730 is commonly attached to a plurality of the battery packs 100. The thermostat 730 includes a first heat transfer plate 731, a heat pipe 732a and 732b, and a second heat transfer plate 733.

Like the embodiment of FIGS. 5 and 6, two of the first heat transfer plates 731 are located between each pair of adjacent battery cells 11 to exchange heat with the battery cells 11.

The heat pipe includes the first heat pipe 732a and the second heat pipe 732b. Like the embodiment of FIGS. 5 and 6, the first heat pipe 732a is attached to the surface of the first heat transfer plate 731 opposite to the contact surface with the surface of the battery cell 11 and extends to the outside of the battery module receiving apparatus 20 at the rear side. The second heat pipe 732b is connected to an end of the first heat pipe 732a extending to the rear of the battery module receiving apparatus 20 and extends parallel to the rear of the battery module receiving apparatus 20 at the outside of the battery module receiving apparatus 20.

The first heat pipe 732a may be welded to a corresponding hole of the second heat pipe 732b to establish a connection therebetween. However, in this case, a flow path of a working fluid is not good at the connected portion between the first heat pipe 732a and the second heat pipe 732b, and as a result, the working fluid may not flow smoothly at the connected portion. Accordingly, as shown in FIG. 19, it is preferable to manufacture the first heat pipe 732a and the second heat pipe 732b by forming a lower structure 732a1 and 732b1 and an upper structure 732a2 and 732b2 of the first heat pipe 732a and the second heat pipe 732b, for example, via casting, putting a predetermined amount of a working fluid in the lower structure 732a1 and 732b1, and joining the lower structure 732a1 and 732b1 to the upper structure 732a2 and 732b2 via welding. Here, as shown in FIG. 19, it is more preferable to form the lower structure 732a1 and 732b1 and the upper structure 732a2 and 732b2 to provide a smooth flow path 732 of the working fluid at the connected portion of the first heat pipe 732a and the second heat pipe 732b.

The second heat transfer plate 733 is connected to an end of the second heat pipe 732b extending parallel to the rear of the battery module receiving apparatus 20 at the outside of the battery module receiving apparatus 20 at the rear side to exchange heat with the air. The previous embodiments show the second heat transfer plate 33 and 433 perpendicular to the plane formed by the first heat transfer plate 31 and 431, while the second heat transfer plate 733 of this embodiment is parallel to the plane formed by the first heat transfer plate 731.

In FIGS. 17 and 18, two of the first heat pipes 732a are provided to each pair of adjacent first heat transfer plates 731 and two of the second heat pipes 732b are provided accordingly, however the first and the second heat pipes may vary in number. Also, two of the first heat transfer plates 731 are attached to both sides of the first heat pipe 732a, however only one first heat transfer plate 731 may be attached to any one side of the first heat pipe 732a. Also, the second heat transfer plate 733 may have a heat dissipation pin or a heat absorption pin on the surface thereof to improve the efficiency of heat exchange with the air.

The features described in a specific embodiment or variations may be applied to other embodiments unless there is a structural inconsistency.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A battery module receiving apparatus having an inner space for receiving a plurality of plate-like battery cells and a plurality of heat transfer plates of a thermostat, the battery module receiving apparatus comprising:
    first and second side plates provided opposite to each other to form the opposite side surfaces of the inner space;
    an upper plate connecting the upper edges of the first and second side plates to form an upper surface of the inner space; and
    a lower plate, opposite to the upper plate, connecting the lower edges of the first and second side plates to form a lower surface of the inner space,
    wherein a plurality of battery cell insertion slots are formed on the lower surface of the upper plate and the upper surface of the lower plate at corresponding locations parallel to the first and second side plates to erectly insert a plurality of the battery cells,
    wherein a plurality of heat transfer plate insertion slots are formed adjacent to a plurality of the battery cell insertion slots on the lower surface of the upper plate and the upper surface of the lower plate at corresponding locations parallel to the first and second side plates to erectly insert the heat transfer plates and allow the heat transfer plates to closely contact the surfaces of the battery cells,
    wherein the plurality of the battery cell insertion slots are formed starting from a front end of the upper plate and the lower plate and ending with a location spaced away from a rear end at a predetermined distance so that plurality of the battery cells are only inserted through a front of the battery module receiving apparatus, and when a plurality of the battery cells are inserted, the electrode tabs of the battery cell are exposed at a location spaced away inwards from the front end of the battery module receiving apparatus, and
    wherein a plurality of the heat transfer plate insertion slots are formed starting from the rear end of the upper plate and the lower plate and ending with a location spaced away from the front end at a redetermined distance so that a plurality of the heat transfer plates are only inserted through a rear of the battery module receiving apparatus.

2. The battery module receiving apparatus according to claim 1, further comprising:
    a front cover to cover the front of the battery module receiving apparatus.

3. A power storage system, comprising:
    a plurality of battery packs; and
    a thermostat to cool or heat a plurality of battery cells received in an inner space of each of the battery packs,
    wherein each of a plurality of the battery cells has a rectangular plate shape, and each of a plurality of the battery packs erectly receives a plurality of the battery cells in the inner space parallel to each other,
    wherein the thermostat includes:
        a plurality of first heat transfer plates inserted between a plurality of the battery cells of each of the battery packs in contact with the surfaces of the battery cells;
        a plurality of heat pipes installed to a plurality of the first heat transfer plates and extending to the outside of the battery packs; and
        a second heat transfer plate commonly connected to ends of a plurality of the heat pipes extending to the outside of the battery packs at the outside of the battery packs,
    wherein each of a plurality of the battery packs has a ease to receive a plurality of the battery cells, a plurality of the first heat transfer plates, and a plurality of the heat pipes,
    wherein the case includes:
        first and second side plates provided opposite to each other to form the opposite side surfaces of the inner space;
        an upper plate connecting the upper edges of the first and second side plates to form an upper surface of the inner space; and a lower plate, opposite to the upper plate, connecting the lower edges of the first and second side plates to form a lower surface of the inner space, wherein a plurality of battery cell insertion slots are formed on the lower surface of the upper plate and the upper surface of the lower plate at corresponding locations parallel to the first and second side plates to erectly insert a plurality of the battery cells, wherein a plurality of heat transfer plate insertion slots are formed adjacent to a plurality of the battery cell insertion slots on the lower surface of the upper plate and the upper surface of the lower plate at corresponding locations parallel to the first and second side plates to erectly insert a plurality of the first heat transfer plates and allow the first heat transfer plates to closely contact the surfaces of the battery cells, wherein the plurality of the battery cell insertion slots are formed starting from a front end of the upper plate and the lower plate and ending with a location spaced away from a rear end at a predetermined distance so that a plurality of the battery cells are only inserted through a front of the battery module receiving apparatus, and when a plurality of the battery cells are inserted, the electrode tabs of the battery cell are exposed at a location spaced away inwards from the front end of the battery module receiving apparatus, and wherein a plurality of the heat transfer plate insertion slots are formed starting from the rear end of the upper plate and the lower plate and ending with a location spaced away from the front end at a predetermined distance so that a plurality of the heat transfer plates are only inserted through a rear of the battery module receiving apparatus.

4. The power storage system according to claim 3, wherein a pair of the first heat transfer plates are inserted between a pair of adjacent battery cells of each of the battery packs in contact with the surfaces of the battery cells, and the heat pipe is inserted between a pair of the first heat transfer plates to connect to a pair of the first heat transfer plates.

5. The power storage system according to claim 4, wherein a pair of the first heat transfer plates have grooves formed on the facing surfaces thereof, into which the heat pipe is introduced.

6. The power storage system according to claim 5, wherein the grooves are formed in a zigzag shape and the heat pipe is introduced into the grooves in a zigzag shape.

7. The power storage system according to claim 4, wherein the first heat transfer plate has a plurality of holes formed therein parallel to each other, into which the heat pipe is introduced respectively.

8. The power storage system according to claim 4, wherein the first heat transfer plate has a plurality of holes formed therein parallel to each other, which are filled with a working fluid to form the heat pipe.

9. The power storage system according to claim 4, wherein the heat pipe includes a first heat pipe installed to the first heat transfer plate and extending to the outside of the battery pack, and a second heat pipe having one end connected to the end of the first heat pipe extending to the outside of the battery pack at the outside of the battery pack and the other end connected to the second heat transfer plate.

10. The power storage system according to claim 4, wherein the heat pipe is connected to one side of the first heat transfer plate at the outside of the battery pack.

11. The power storage system according to claim 10, wherein the first heat transfer plate comprises one plate-like member, and the plate-like member is bent to surround the heat pipe to connect with the heat pipe.

12. The power storage system according to claim 3, further comprising:
a fan to forcedly supply air to the second heat transfer plate.

13. The power storage system according to claim 10, wherein the heat pipe comprises a plate-like member having a plurality of holes formed therein parallel to each other and slots provided between the plurality of holes, and
wherein the first heat transfer plate is inserted into each slot at the outside of the battery pack to connect with the heat pipe.

* * * * *